(12) United States Patent
Lou et al.

(10) Patent No.: US 12,537,565 B2
(45) Date of Patent: Jan. 27, 2026

(54) COORDINATED MULTI-ACCESS POINT TRANSMISSIONS FOR WIRELESS LOCAL AREA NETWORK SYSTEMS

(71) Applicant: InterDigital Patent Holdings, Inc., Wilmington, DE (US)

(72) Inventors: Hanqing Lou, Syosset, NY (US); Li Hsiang Sun, San Diego, CA (US); Xiaofei Wang, North Caldwell, NJ (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 555 days.

(21) Appl. No.: 17/919,868

(22) PCT Filed: Apr. 28, 2021

(86) PCT No.: PCT/US2021/029588
§ 371 (c)(1),
(2) Date: Oct. 19, 2022

(87) PCT Pub. No.: WO2021/222374
PCT Pub. Date: Nov. 4, 2021

(65) Prior Publication Data
US 2023/0163808 A1  May 25, 2023

Related U.S. Application Data

(60) Provisional application No. 63/017,396, filed on Apr. 29, 2020.

(51) Int. Cl.
*H04B 7/024* (2017.01)
*H04W 52/14* (2009.01)
*H04W 52/24* (2009.01)

(52) U.S. Cl.
CPC .......... *H04B 7/024* (2013.01); *H04W 52/143* (2013.01); *H04W 52/243* (2013.01)

(58) Field of Classification Search
CPC ... H04B 7/024; H04B 17/345; H04W 52/143; H04W 52/243; H04W 74/002;
(Continued)

(56) References Cited

U.S. PATENT DOCUMENTS

| | | | |
|---|---|---|---|
| 2020/0076519 A1* | 3/2020 | Asterjadhi | ............ H04L 1/0027 |
| 2020/0076552 A1 | 3/2020 | Cherian et al. | |
| 2020/0077273 A1 | 3/2020 | Cherian et al. | |

OTHER PUBLICATIONS

IEEE 802.11 18/1231r4 (IEEE 802.11-18/0xxxr04) "802.11 EHT Proposed PAR" Jan. 2019, 4 pages.
(Continued)

*Primary Examiner* — Eugene Yun
(74) *Attorney, Agent, or Firm* — Chris Kolefas

(57) ABSTRACT

A method performed by a first wireless access point for coordinating a multi-access point transmission in a wireless network of multiple access points includes receiving an indication of a transmit opportunity for the first wireless access point, transmitting at least one indication frame to the multiple access points comprising information related to the transmit opportunity, receiving at least one request frame from one or more access points of the multiple access points indicating participation with the transmit opportunity, and transmitting a trigger frame to the one or more access points that indicated participation with the transmit opportunity, wherein the trigger frame comprises information indicating respective power levels for the participating access points. The shared transmit opportunity may then be used to transmit downlink data to associated stations of the first wireless access point and the other participating access points during the transmit opportunity.

20 Claims, 29 Drawing Sheets

Example of STA Groups Using Interference Level in C-MAP System

(58) Field of Classification Search
CPC ......... H04L 1/08; H04L 1/1685; H04L 5/001; H04L 5/0055; H04L 1/1887; H04L 5/003; H04L 5/0035; H04L 5/0073; H04L 5/0094
USPC ........................................................ 455/101
See application file for complete search history.

(56) References Cited

OTHER PUBLICATIONS

IEEE P802. 11ax/D6.0, Part 11: Wireless LAN Medium Access Control (MAC) and Physical Layer (PHY) Specifications; Amendment 1: Enhancements for High Efficiency WLAN, Draft Standard for Information technology—Telecommunications and information exchange between systems Local and metropolitan area networks Specific requirements, Nov. 2019, 780 pages.
IEEE 802.11 19/1262r08 "Specification Framework for TGbe," Feb. 2020, 20 pages.
IEEE 802.11 "Part11: Wireless LAN Medium Access Control (MAC) and Physical Layer (PHY) Specifications", IEEE Standard for Information technology—Telecommunications and Information exchange between systems Local and metropolitan area networks—Specific requirements, 2016, 3534 pages.
IEEE 802.11-18/1233r4 (IEEE 802.11012/1077r04) "IEEE 802.11 EHT draft Proposed CSD," Jan. 14, 2019, 7 pages.

* cited by examiner

General Procedure for C-MAP Set up and Transmission and Acknowledgements

Example of STA Groups Using Interference Level in C-MAP System

Exemplary Procedure for C-MAP Transmission with Group 1 Users

Exemplary Procedure for C-MAP Transmission with Group 3 Users

Example of Sequential ACK Transmissions

Example of Concurrent ACK but in Different Frequency Resources

Example of Sharing AP Allocated SR Resource

Example of Eligible STAs for the Set {APa, APb, APc}

Example of Sharing or Shared AP Shared SR Resource

Example of Eligible STAs for the Set {APa, APb,}

Example of Eligible STAs for the Set {APb, APc}

Example Configuration

| Field | Bits |
|---|---|
| Rate | 4 |
| Length | 12 |
| CRC | 1 |
| Tail | 6 |

Table 1
L-SIG Fields

FIG. 23

HE SU PPDU and HE ER SU PPDU

| Field | Bits |
|---|---|
| Format | 1 |
| Beam Change | 1 |
| UL/DL | 1 |
| MCS | 4 |
| DCM | 1 |
| BSS Color | 6 |
| Reserved | 1 |
| Spatial Reuse | 4 |
| Bandwidth | 2 |
| GI+LTF | 2 |
| NSTS and Midamble Periodicity | 3 |
| TXOP | 7 |
| Coding | 1 |
| LDPC Extra Symbol Segment | 1 |
| STBC | 1 |
| Beam Formed | 1 |
| Pre-FEC Padding Factor | 2 |
| PE Disambiguity | 1 |
| Reserved | 1 |
| Doppler | 1 |
| CRC | 4 |
| Tail | 6 |

HE MU PPDU

| Field | Bits |
|---|---|
| UL/DL | 1 |
| SIGB MCS | 3 |
| SIGB DCM | 1 |
| BSS Color | 6 |
| Spatial Reuse | 4 |
| Bandwidth | 3 |
| # of SIGB Symbols or MU-MIMO Users | 4 |
| SIGB Compression | 1 |
| GI+LTF Size | 2 |
| Doppler | 1 |
| TXOP | 7 |
| Reserved | 1 |
| # of HE-LTF Symbols and Midamble Periodicity | 3 |
| LDPC Extra Symbol Segment | 1 |
| STBC | 1 |
| Pre-FEC Padding Factor | 2 |
| PE Disambiguity | 1 |
| CRC | 4 |
| Tail | 6 |

HE TB PPDU

| Field | Bits |
|---|---|
| Format | 1 |
| BSS Color | 6 |
| Spatial Reuse 1 | 4 |
| Spatial Reuse 2 | 4 |
| Spatial Reuse 3 | 4 |
| Spatial Reuse 4 | 4 |
| Reserved | 1 |
| Bandwidth | 2 |
| TXOP | 7 |
| Reserved | 9 |
| CRC | 4 |
| Tail | 6 |

Table 2
HE-SIG-A Fields with Different PPDU

FIG. 24

| Sub-channel | Eligible AP Set of the Sub-channel (Provided by Sharing APa) | Suitable STAs (Determined by Eligible AP) |
|---|---|---|
| Sub-20-ch1 | {APa, APb} | BSSa STAs in Areas 3, 2.1<br>BSSb STAs in Areas 3, 2.3 |
| Sub-20-ch2 | {APb, APc} | BSSb STAs in Areas 3, 2.2<br>BSSc STAs in Areas 3, 2.1 |
| Sub-20-ch3 | {APc, APa} | BSSc STAs in Areas 3, 2.3<br>BSSa STAs in Areas 3, 2.2 |
| Sub-20-ch4 | {APa, APb, APc} | STAs in Area 3 |

Table 3
Configuration Using "Sharing AP Allocated Spatial Reuse (SR) Resource"

FIG. 25

| Sub-channel | Sub-channel Assigned to | (Eligible AP Set of the Sub-channel) / (AP Providing the Eligible Set) | Suitable STAs (Determined by Eligible AP) |
|---|---|---|---|
| Sub-20-ch1 | APa | {APa, APb}/APa | BSSa STAs in Areas 3, 2.1<br><br>BSSb STAs in Areas 3, 2.3 |
| Sub-20-ch2 | APb | {APb, APc}/APb | BSSb STAs in Areas 3, 2.2<br><br>BSSc STAs in Areas 3, 2.1 |
| Sub-20-ch3 | APc | {APc, APa}/APc | BSSc STAs in Areas 3, 2.3<br><br>BSSa STAs in Areas 3, 2.2 |
| Sub-20-ch4 | APa | {APa, APb, APc}/APa | STAs in Area 3 |

Table 4
Configuration Using "AP Determining Sharable SR Resource from Allocated per-BSS OFDMA/TDMA Resource by Sharing AP"

FIG. 26

COORDINATED MULTI-ACCESS POINT TRANSMISSIONS FOR WIRELESS LOCAL AREA NETWORK SYSTEMS

CROSS REFERENCE TO RELATED APPLICATIONS

This application is a U.S. National Stage Application under 35 U.S.C. § 371 of International Patent Application No. PCT/US2021/029588, filed 28 Apr. 2021, which claims the benefit of U.S. provisional patent application No. 63/017,396 filed 29 Apr. 2020 which is incorporated by reference herein in its entirety.

BACKGROUND

Multi-Access Point configurations can result when multiple access points (APs) are within range of each other. Connectivity to stations (STAs) from different APs at the same time remains a challenge in terms of time/frequency resource allocation for transmission. As the number of STA devices requiring the use of wireless networks increases, there is a need for greater resource utilization in wireless networks having overlapping access point coverages. Currently, multiple access points in the same wireless environment cannot use the same time and frequency resources to simultaneously utilize a transmit opportunity of just one of the access points. Thus, new methods of accommodating Multi-Access Point transmissions is desirable in wireless local area networks.

SUMMARY

In one embodiment, a method performed by a first wireless access point for coordinating a multi-access point transmission in a wireless network of multiple access points includes receiving an indication of a transmit opportunity for the first wireless access point, transmitting at least one indication frame to the multiple access points comprising information related to the transmit opportunity, receiving at least one request frame from one or more access points of the multiple access points indicating participation with the transmit opportunity, and transmitting a trigger frame to the one or more access points that indicated participation with the transmit opportunity, wherein the trigger frame comprises information indicating respective power levels for the participating access points. The shared transmit opportunity may then be used to transmit downlink data to associated stations of the first access point and the other participating access points during the transmit opportunity. Thereafter, the access points may receive one or more acknowledgement transmissions from at least one station associated with the first wireless access point and the other participating access points.

In one embodiment a method may be performed by an access point that is to share a transmit opportunity with other access point in a wireless network of multiple access points. In the embodiment, the access point, being a sharing/controlling access point, may receive, from multiple stations, an indication of interference levels, the interference levels determined by the stations themselves. The access point may then generate a station group to receive a downlink transmission from an associated access point during the shared transmit opportunity. The station group may be determined based on the received interference levels of the multiple station interference levels. The sharing/controlling access point may then control a transmit power level from the access point to target the generated station group during the shared transmit opportunity.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref") in the Figures indicate like elements, and wherein.

Table 1 presents example L-SIG Field lengths;

Table 2 presents example HE-SIG-A Fields for Different PPDUs;

Table 3 presents an example Configuration using a Sharing AP allocated Spatial Reuse (SR) Resource scheme; and Table 4 presents example Configuration using an AP determining sharable SR resource from allocated per-BSS OFDMA/TDMA resource by Sharing AP scheme.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
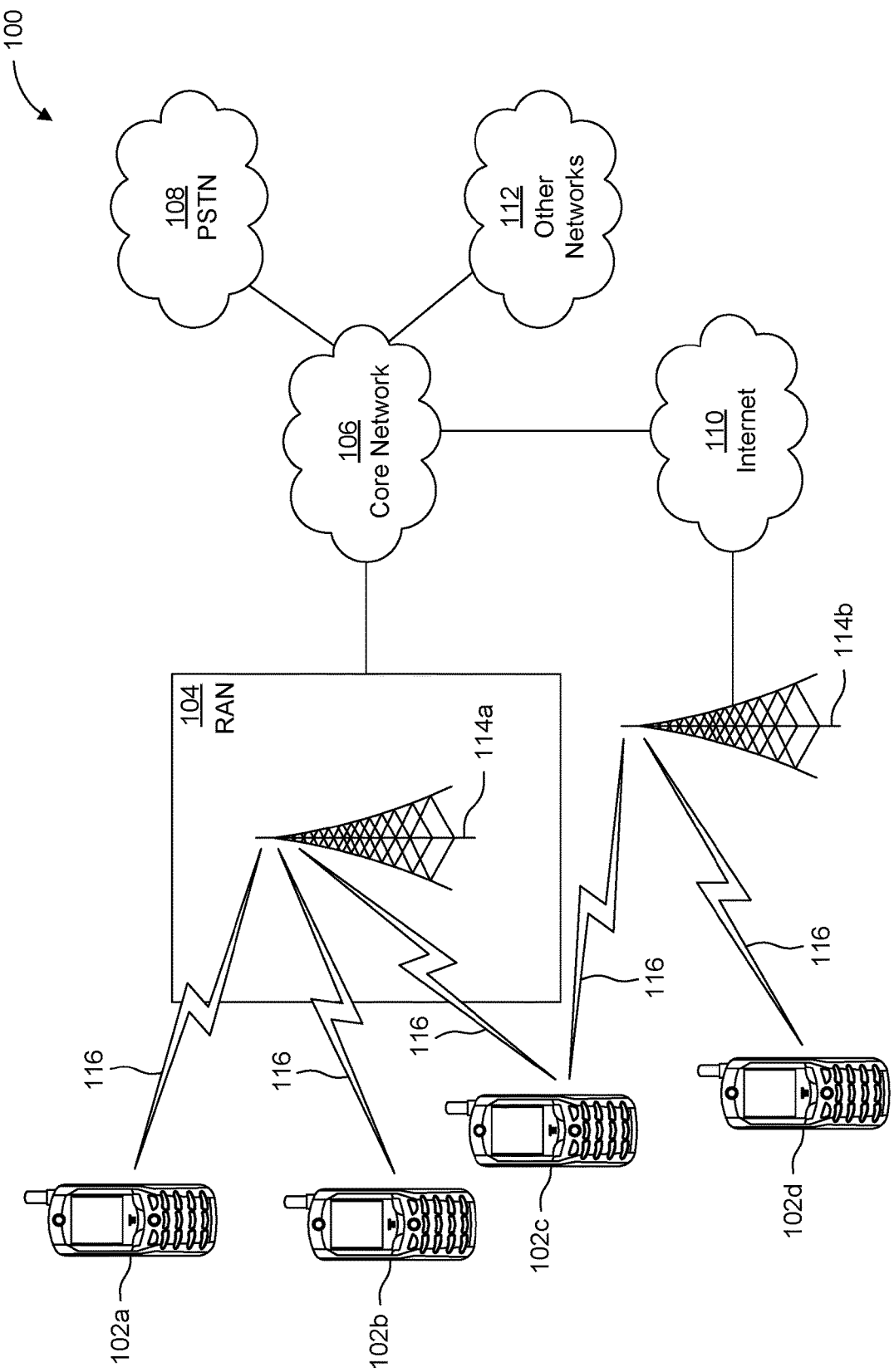
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMVD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
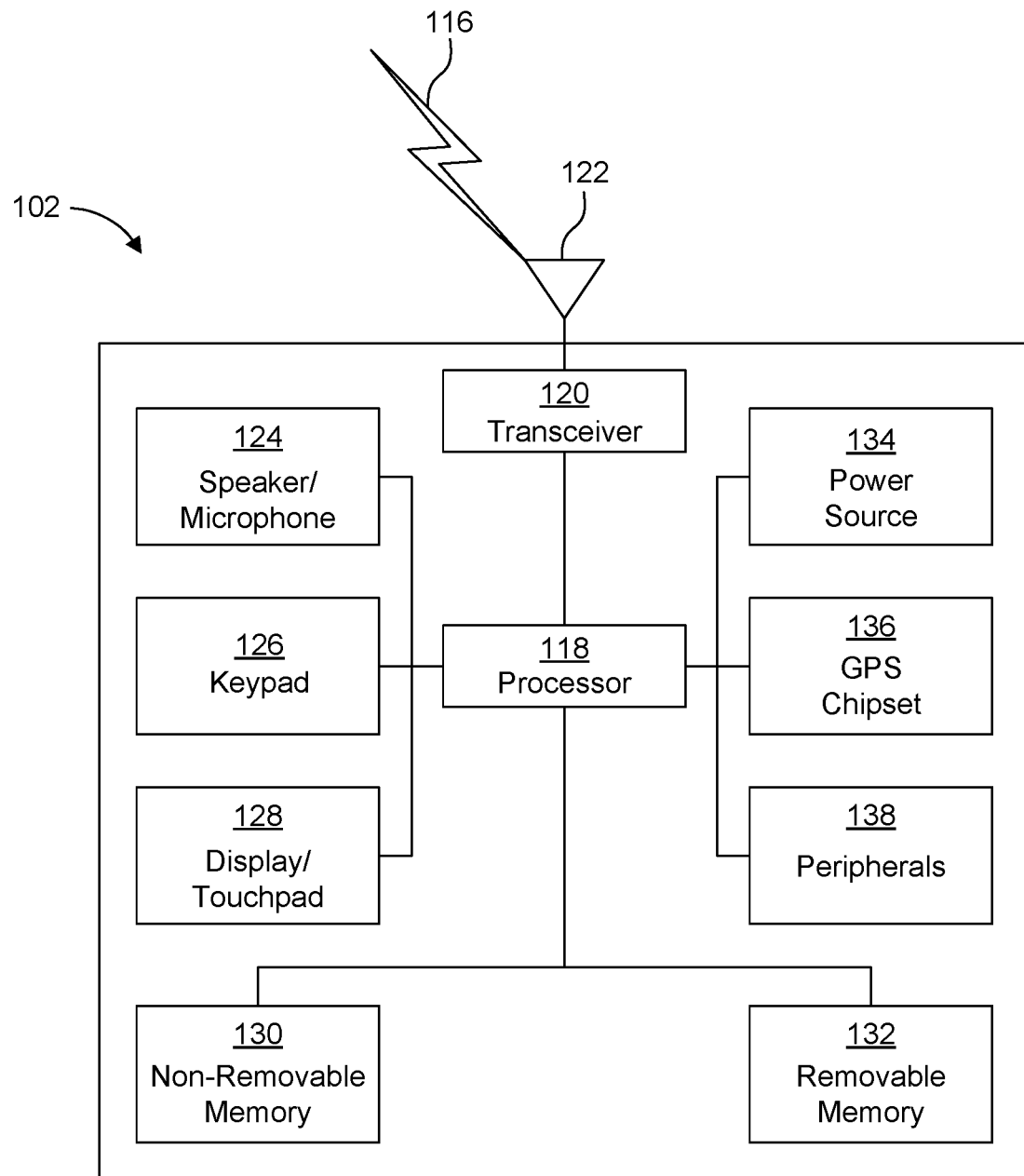
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
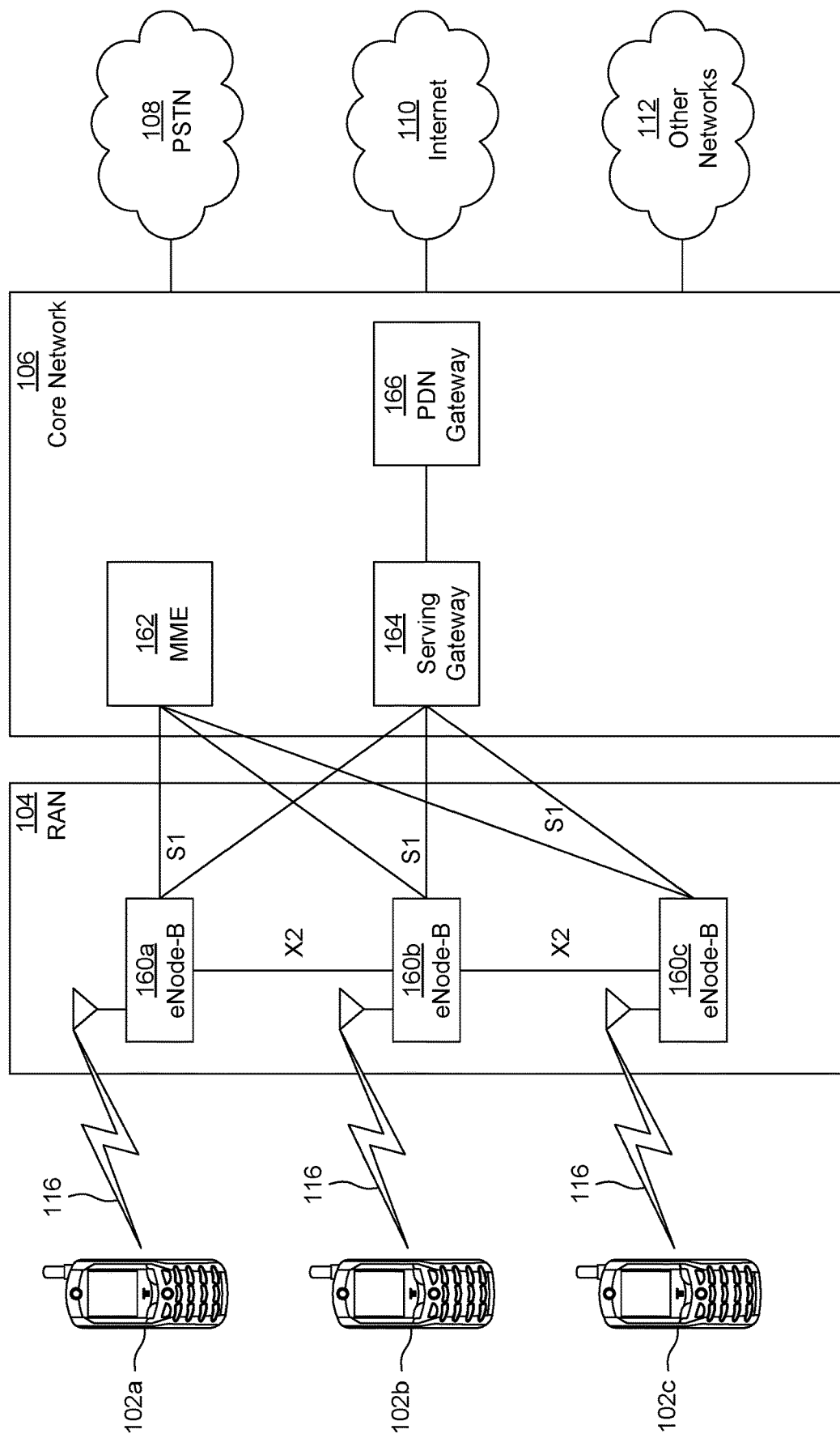
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
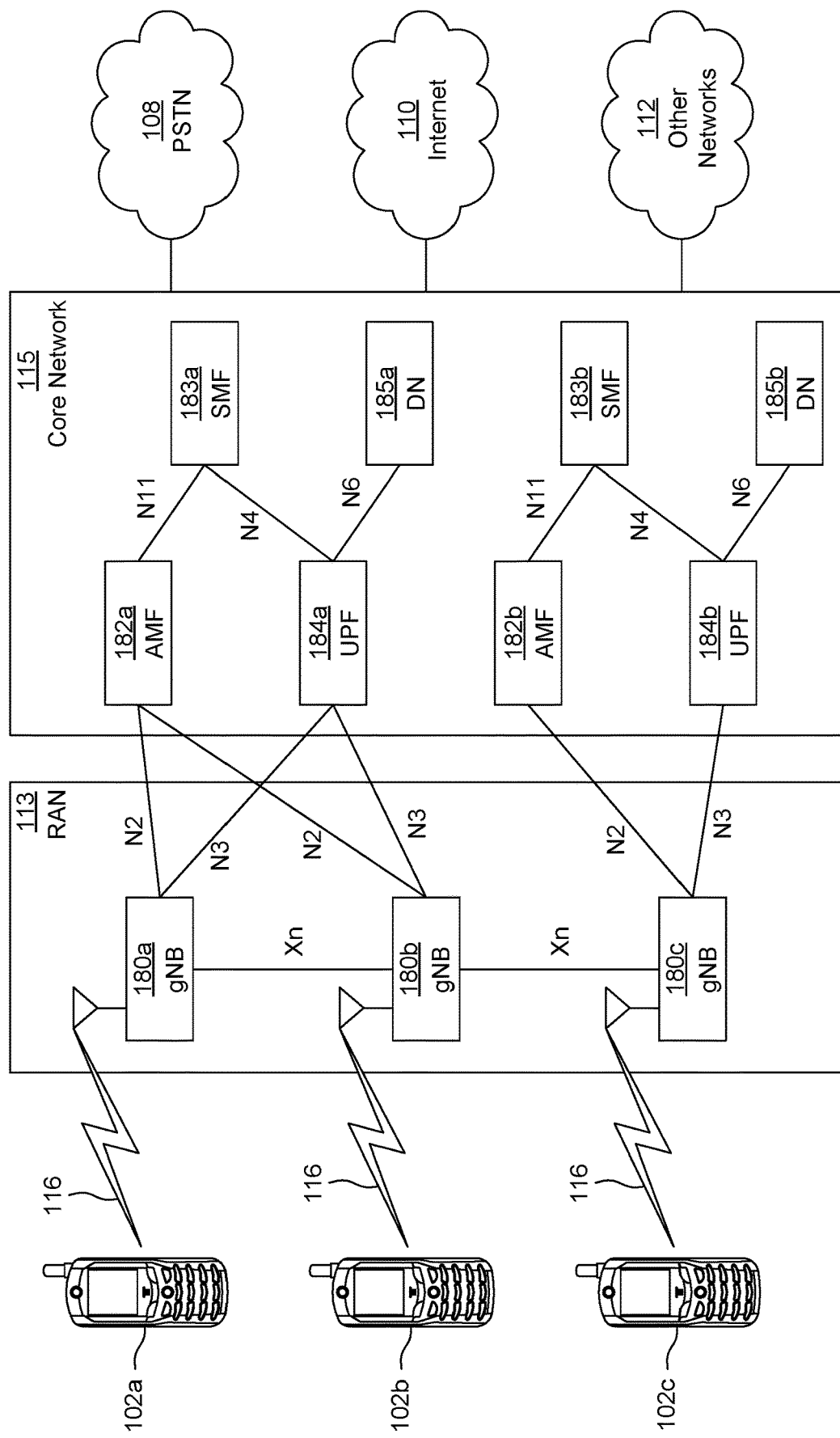
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of (non-access stratum) (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit receive unit (WTRU) may be an example of a user equipment (UE). Hence the terms UE and WTRU may be used in equal scope herein.

Overview of WLAN System

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA.

Using the IEEE 802.11ac, (IEEE Std 802.11™-2016: Wireless LAN Medium Access Control (MAC) and Physical Layer (PHY) Specifications), infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an IEEE 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In IEEE 802.11n, (See IEEE Std 802.11™-2016), High Throughput (HT) STAs may also use a 40 MHz wide channel for communication. This is achieved by combining the primary 20 MHz channel, with an adjacent 20 MHz channel to form a 40 MHz wide contiguous channel.

In IEEE 802.11ac, (See IEEE Std 802.11™-2016, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to IEEE 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. Inverse Fast Fourier Transform (IFFT), and time domain, processing is performed on each stream separately. The streams are then mapped on to the two channels, and the data is transmitted. At the receiver, this mechanism is reversed, and the combined data is sent to the MAC.

To improve spectral efficiency IEEE 802.11ac has introduced the concept for downlink Multi-User Multiple Input Multiple Output (MU-MIMO) transmission to multiple STA's in the same symbol's time frame, e.g. during a downlink Orthogonal Frequency-division Multiplexing (OFDM) symbol. The potential for the use of downlink MU-MIMO is also currently considered for IEEE 802.11ah. It is important to note that since downlink MU-MIMO, as it is used in IEEE 802.11ac, uses the same symbol timing to multiple STA's interference of the waveform transmissions to multiple STA's, then downlink MU-MIMO is not an issue. However, all STA's involved in MU-MIMO transmission with the AP must use the same channel or band, this limits the operating bandwidth to the smallest channel bandwidth that is supported by the STA's which are included in the MU-MIMO transmission with the AP.

IEEE 802.11ax Physical Layer Protocol Data Unit (PPDU)

IEEE 802.11ax (11ax), (IEEE P802.11ax™/D3.0, Amendment 6: Enhancements for High Efficiency WLAN", 2018), defines a physical layer specification and medium access control layer specification that enables High Efficiency (HE) operation for IEEE 802.11 devices. IEEE 802.11ax is considered a next main generation of Wi-Fi after IEEE 802.11ac. IEEE 802.11ax defined new numerology with smaller subcarrier spacing. Downlink/Uplink (DL/UL) OFDMA is introduced in 11ax to achieve better spectrum efficiency.

Figure 2:
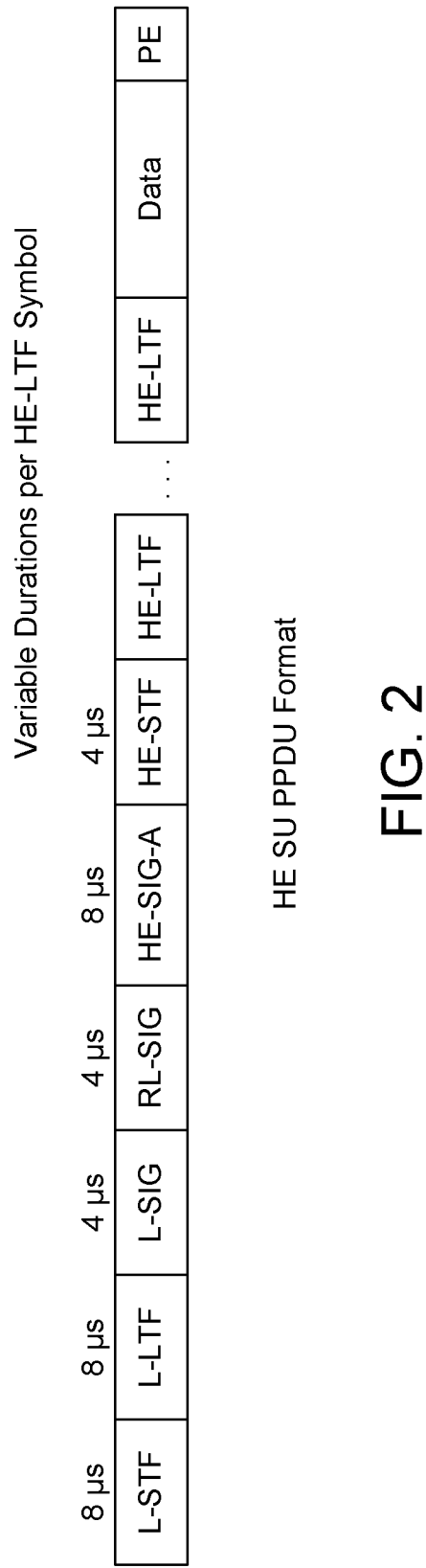
FIG. 2 depicts an example HE SU PPDU format.
Figure 3:
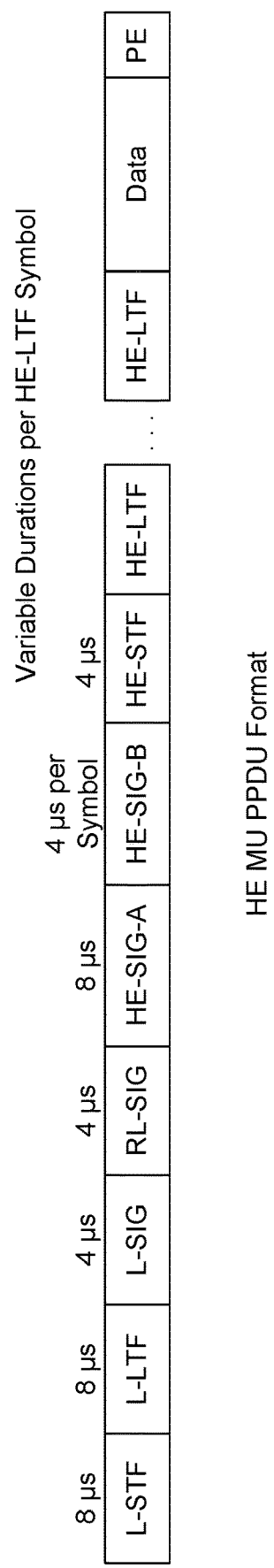
FIG. 3 depicts an example HE MU PPDU format.
Figure 4:
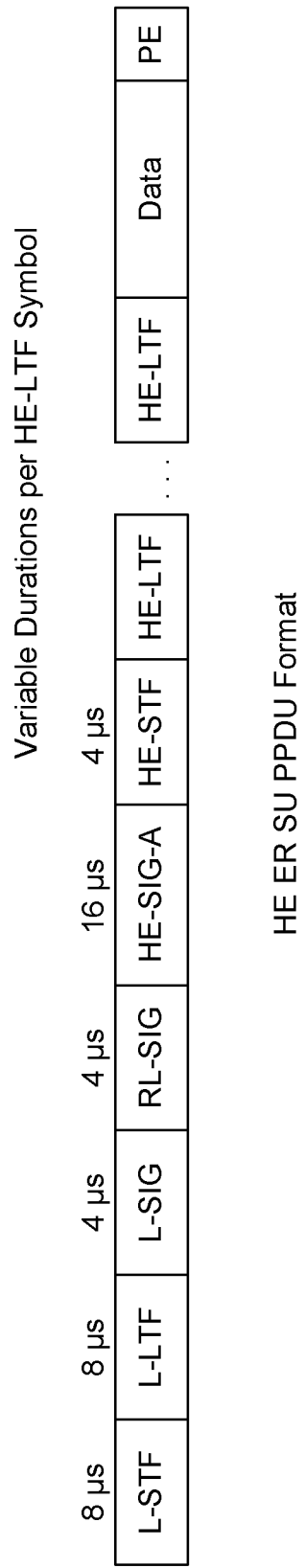
FIG. 4 depicts an example HE ER SU PPDU format.
Figure 5:
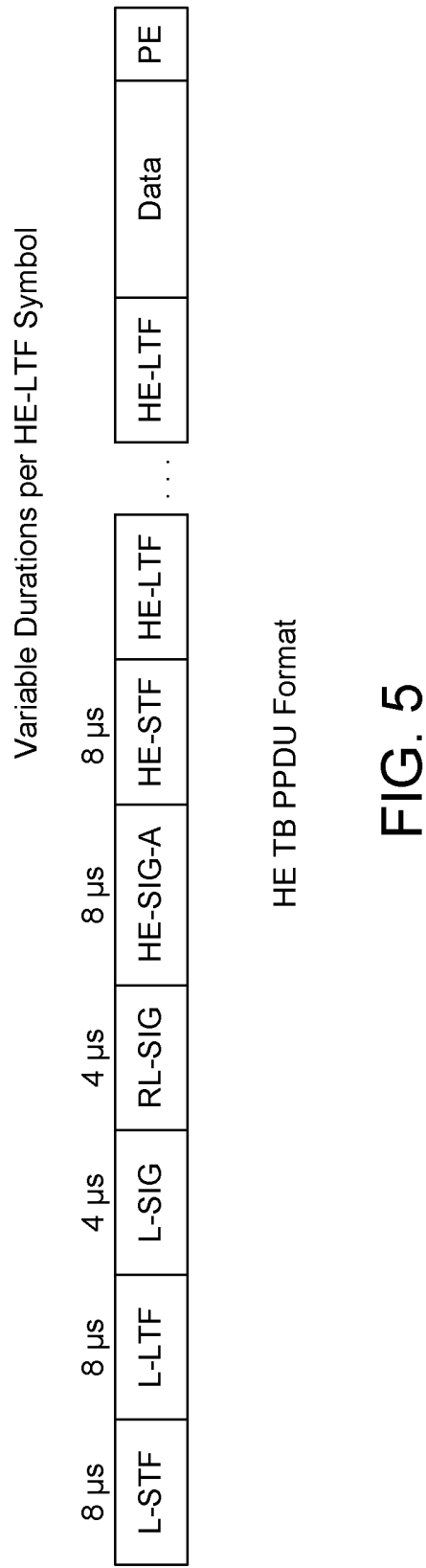
FIG. 5 depicts an example HE TB PPDU format.

In IEEE 802.11ax, four PPDU formats are supported:
a. High Efficiency Single User PPDU (HE SU PPDU): this PPDU format is used for single user transmission. Refer to FIG. 2 for the HE SU PPDU format.
b. High Efficiency Multiple User PPDU (HE MU PPDU): this PPDU format is used for transmissions to one or more users if the PPDU is not a response of a Trigger frame. High Efficiency Signal Field-B (HE-SIG-B) field presents in the PPDU format of FIG. 3.
c. High Efficiency Extended Range PPDU (HE ER SU PPDU): This PPDU format is used for SU transmission with extended range. In this format, the HE-SIG-A field is twice as long as the High Efficiency Signal Field-B (HE-SIG-A) field in other HE PPDU. Refer to FIG. 4 for the HE ER SU PPDU format.
d. High Efficiency Trigger-Based PPDU (HE TB PPDU): this PPDU format is used for a transmission that is a response to the Trigger frame or a frame carrying a Triggered Response Scheduling (TRS) control subfield from an AP. The duration of the High Efficiency-Short Training Field (HE-STF) field in the HE TB PPDU is 8us, doubled size of that in other HE PPDU. Refer to FIG. 5 for the HE TB PPDU format.

Legacy Signal (L-SIG) field, HE-SIG-A field and HE-SIG-B field carry Physical (PHY) layer control information for the PPDU. L-SIG field contains legacy numerology and format, so that all the STAs understand L-SIG field. HE-SIG-A field and HE-SIG-B field are understood by HE STAs. L-SIG fields, (See IEEE Std 802.11™-2016), are given in Table 1. HE-SIG-A fields for different PPDU formats are given in Table 2.

IEEE 802.11be Multi-AP Transmissions

Coordinated multi-AP (C-MAP) transmissions will be supported in IEEE 802.11be. Standard discussions include:
a. Coordinated Multi-AP OFDMA,
b. Coordinated Multi-AP TDMA
c. Coordinated Multi-AP (C-MAP) Spatial Reuse IEEE 802.11be may define a mechanism to determine whether an access point (AP) is part of an AP candidate set and can participate as a shared AP in coordinated AP transmission initiated by a sharing AP. However, it may be desirable to define a procedure for an AP to share its frequency/time resources of an obtained transmit opportunity (TXOP) with a set of APs. An AP that intends to use the resource (i.e., frequency or time) shared by another AP should be able to indicate its resource needs to the AP that shared the resource. Coordinated OFDMA is supported in IEEE 802.11be, and in a coordinated OFDMA, both downlink (DL) OFDMA and its corresponding uplink (UL) OFDMA acknowledgement are allowed.

Objective/Problem Statements

Objective/Problem 1: C-MAP Architecture

Although some features concerning C-MAP have been specified, a detailed definition and architecture are not given. For example, IEEE 802.11be may define a mechanism to determine whether an AP is part of an AP candidate set and can participate as a shared AP in coordinated AP transmission initiated by a sharing AP. However, open questions arise as to (i) What is a candidate set and how to form/deform/update a candidate set? and (ii) How does an AP to acquire a media and share with other APs?

Objective/Problem 2: Group Based Transmission

In a C-MAP communication, non-AP STAs may experience different interference levels from APs within the C-MAP group of STAs. For example, some STAs may be able to hear from one AP, thus, no interference from other AP transmission to those STAs. Some STAs may hear all the APs, thus APs need to use different time/frequency resources to transmit to those STAs. C-MAP transmissions may be more efficient if interference conditions of STAs are considered.

Proposed Solutions

Embodiment 1: C-MAP Architecture; General Procedure

Figure 6:
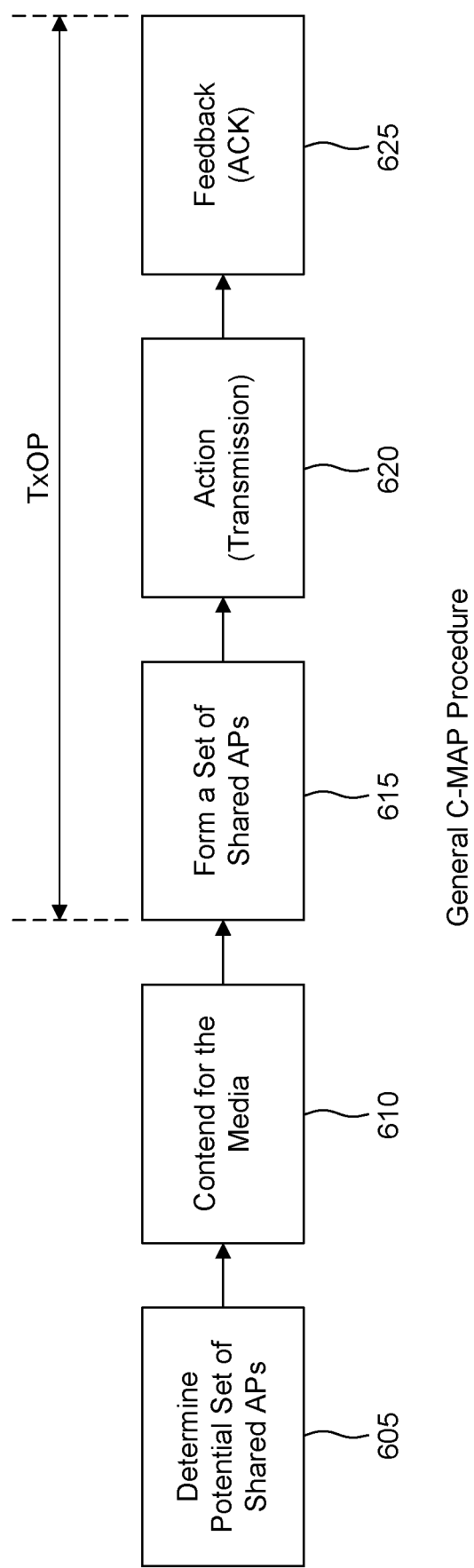
FIG. 6 depicts a general coordinated multi-AP (C-MAP) procedure.

In general, Coordinated Multi AP (C-MAP) transmissions may need a few steps to complete the coordinated operation. FIG. 6 shows the basic idea. Herein, an AP that gains a TXOP is able to control which other APs may share the TXOP. Thus, the sharing AP may also be termed a controlling AP. Other APs which are offered to share an available TXOP of the sharing or controlling AP may be termed potential shared or potential participating APs. Such other APs have the opportunity to either participate in the shared TXOP or deny the opportunity.

Figure 7:
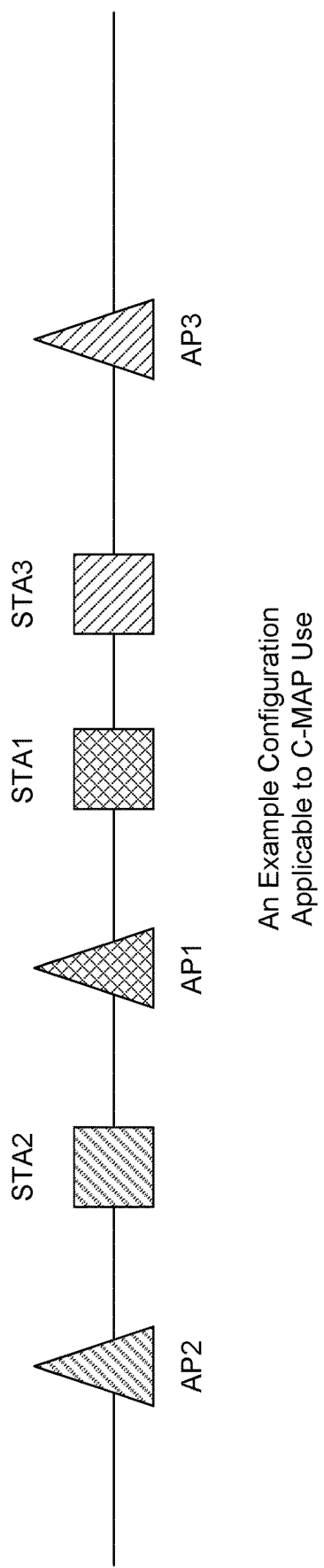
FIG. 7 depicts an example C-MAP.

FIG. 6 depicts a general C-MAP procedure. At 605, labeled "Determine Potential Set of Shared APs", may for each AP, if capable, to determine which other APs in the deployment area may be capable of doing certain coordination, e.g., coordination in time, frequency, spatial or power, and other capabilities, such as bandwidth, number of antennas, etc. This step may be achieved in two alternative methods, or use them jointly:

(1) Each AP decodes the beacon frames transmitted from other APs over the air or via wired backhaul which may contain AP's ID and coordination capability information. The AP that receives the beacons from potential set of shared APs may create multiple sets, one for each coordination capability. A particular shared AP may have multiple coordination capabilities, so it may belong to multiple sets. As an example, FIG. 7 illustrates the concept in an example configuration where a C-MAP may be applicable. In this example, STAi is associated to APi, for i=1, 2, 3. AP1 can receive beacon frame from APj, for j=2, 3 and vice versa; but AP2 cannot receive beacon frame from AP3 and vice versa. So, AP1 may find potential set of shared APs are {AP2, AP3}; AP2 may find potential set of shared APs are {AP1}; and AP3 may find potential set of shared APs are {AP1}. Assuming there are two possible capabilities, denoted as Cap1 (access to one other AP) and Cap2 (access to two other APs). Both AP1 and AP2 have both these capabilities, but AP3 has only Cap1. Then, AP1 can keep two sets of APs with two different capabilities: {AP2, AP3} for Cap1, and {AP2} for Cap2. The similar operation may be done at AP2 and AP3.

(2) In another method, each AP may generate the potential set of shared APs via assistance from STAs. Here each STA may have capability to transmit a frame that contains coordination capability of its associated AP. This frame may be overheard by other APs, associated or not associated, nearby, which would help them to know the potential set of shared APs. Using FIG. 7 as an example configuration, it may be assumed that AP1 can receive signals from AP2 but can't receive signal from AP3. However, AP1 can receive signals from all STAs in FIG. 7. In the scenario, if using method (1) above, AP1 can only include AP2 to its potential set of shared APs, i.e., {AP2}. However, if using this method, both AP2 and AP3 may be included in the set, i.e., {AP2, AP3}.

Note that the above two methods may be proceed jointly. For example, the potential set of shared APs for each AP may be formed using the first method, then followed by the second method.

The identification of the potential set of shared APs for each AP may take place whenever it sees a beacon frame from another AP, or detecting the beacon frame periodically with a certain duty cycle.

Returning to FIG. 6, at 610, APs in a deployment area may contend for the media (access the media so as to not have contention for the wireless resource to be used) to gain a transmission opportunity (TXOP) if there is data or a signal to transmit or receive. This can be done in a random way or in a coordinated way. The latter case may be likely viable in wired backhaul scenario, where the AP who has high priority data to transmit or large packet to transmit may inform the other APs in the potential set of shared APs to obtain the media. The rest of steps (615, 620, 625) in FIG. 6 may depend on the type of coordination schemes. At 615, the AP that has acquired a TXOP interactively forms a set of shared APs. At 620, the shared set of APs that can use the TXOP take the opportunity to perform DL transmissions. At 625 the various receivers (STAs) provide feedback, such as acknowledgements to respective APs. The following sections have more details.

TXOP Based C-MAP Procedure

Throughout this disclosure, the following definitions may be used:
a. Sharing AP: A sharing AP is an AP which acquires a channel to start a TXOP and shares the time/frequency resource of the TXOP with other APs.
b. Shared AP: A shared AP is an AP which joins a sharing AP with an TXOP and shares the time/frequency resources of the TXOP. A shared AP may also be termed a joined AP.
c. AP Candidate set: APs may form an AP candidate set for some C-MAP transmissions. The AP candidate set may be identified by an AP candidate set ID. APs in C-MAP transmissions may belong to a subset of an AP candidate set. For example, an AP in the set acquires a TXOP and intend to share it, the AP may choose one or more APs in an AP candidate set to share the TXOP.

Figure 8:
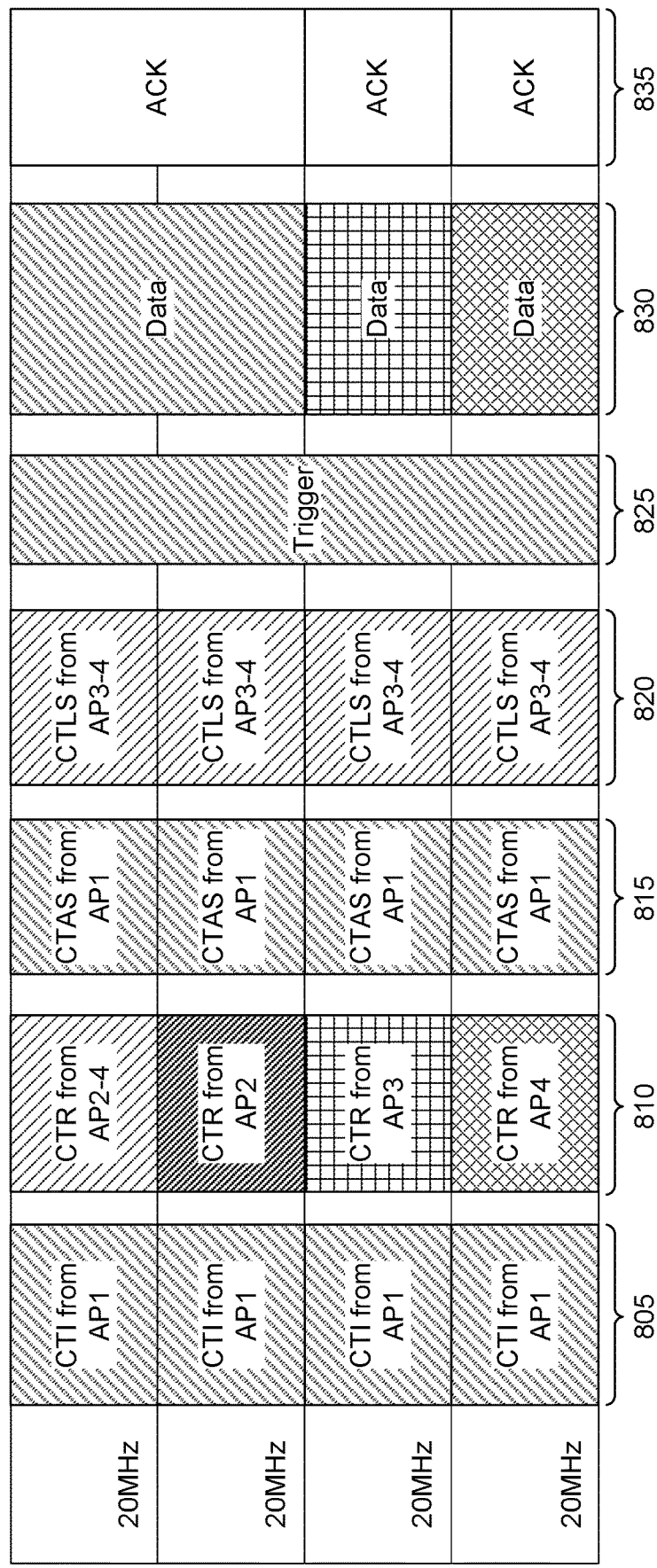
FIG. 8 depicts a general procedure for C-MAP set up and transmission and acknowledgements.

An exemplary C-MAP procedure is shown in FIG. 8. In the example of FIG. 8, the vertical axis is divided into 20 MHz channels. The horizontal axis is divided into labeled time frames indicating transmissions within each 20 MHz channel or across the entire bandwidth. In this example, AP1 may be the sharing AP and start an TXOP. AP1 may ask AP2, AP3 and AP4, which are from an AP candidate set, if they plan to join the TXOP for a C-MAP transmission. AP2 may deny the TXOP while AP3 and AP4 may join. AP1 may allocate time/frequency resources to AP3 and AP4. AP3 and AP4 may repeat this information so that associated STAs may notice the upcoming transmission. AP1 may transmit a trigger frame, such as is defined in IEEE 802.11ax, for example, to trigger concurrent DL transmission from one or more APs to one or more non-AP STAs. The DL data in concurrent TXOP transmissions from participating APs need not contain the dame data for different STA groups. The trigger frame may carry different contents from IEEE 802.11ax defined trigger frames. The APs then may start DL transmission, and UL acknowledgements may follow. The more detailed description is given below:

a. AP1 may acquire a channel and start a shared C-MAP TXOP. AP1 may be the sharing AP in this example.
b. At 805, AP1 may transmit a coordinated AP (CAP) TXOP Indication (CTI) frame to a set of APs which may be potential coordinated or shared APs for the TXOP. Herein, a CAP may be considered interchangeable with the term C-MAP.
  (i) Recipients of CTI frame:
    (1) In one method, the recipient APs may be selected by the sharing AP in its AP candidate set. AP1 may explicitly indicate the recipient APs using their BSSID, BSS color, AP ID in the AP candidate set. The AP ID in the AP candidate set may be an ID assigned to the AP when it joined the AP candidate set. The AP ID may be unique in the AP candidate set. With this method, AP1 may allocate time/frequency resource for each recipient AP for its response frame transmission.
    (2) In one method, the recipient APs may be any AP in the AP candidate set. AP1 may indicate the candidate set group ID in CTI frame and indicate the CTI may be used to trigger transmissions from all the APs in the AP candidate set which may be intended to use the shared TXOP. In a method, AP1 may allocate a set of resource units/subchannels to the intended APs to transmit response frame (e.g., CTR frames). The intended APs may randomly select one subchannel or resource unit to transmit the response frame. It may be possible that more than one AP may select the same resource to transmit, and thus collision may happen. In a method, AP1 may allocate a set of resource units to the APs. The APs may use its AP ID to locate the resource unit. For example, an AP know its AP ID value may be the fourth in descending/ascending order in the AP candidate set, the AP may select the fourth resource unit to transmit its response. With this method, an AP which may not intend to join the TXOP may not transmit. Thus, some resource units may not be used.
  (ii) BSS color: BSS color is carried in PHY header of the PPDU which carries the CTI frame. The BSS color may need to be modified and set based on below methods.
    (1) In one method, BSS color may use AP1's BSS color. Another bit in the preamble may be used to indicate the PPDU may be transmitted between APs or used to setup C-MAP transmissions. In this way, a STA which is in a BSS with the same BSS color may know the PPDU may be for other APs. The STA may also know the PPDU may be used to set up C-MAP transmission later. Neighboring APs may know it may be an intended receiver and may continue monitoring the MAC body of the frame.
    (2) In one method, one or more BSS color values may be reserved as group BSS colors or C-MAP BSS colors. For example, M BSS color values may be reserved for group BSS colors or C-MAP BSS colors. AP1 and APs in the candidate set may agree to use one value as the AP candidate set group BSS color when they form the candidate set. APs may include this group BSS color in their Beacon frame so STAs may know this group BSS color. AP1 may include this group BSS color in SIG field of the PPDU which carries the CTI frame. In this way, the STAs and APs may know this is a transmission for APs or C-MAP setup, so that they may continue monitoring or set network allocation vector (NAV) accordingly.

(iii) Transmit address field (TA field): TA field is carried in MAC frame.

(1) In one method, TA field may be set as AP1's MAC address/BSSID. One field in the CTI frame may be used to indicate the frame may be transmitted from an AP to one or more APs or to set up C-MAP transmissions. One field in CTI frame may be used to indicate the frame is an CTI frame. Additionally, one field may be used to indicate the AP candidate set ID. The AP candidate set ID may be a MAC address, compressed MAC address or an ID negotiated when the AP candidate set is formed. APs in the AP candidate set may include this AP candidate set ID in Beacon frames, so the associated STAs may know the AP candidate set ID.

(2) In one method, one or more group-based MAC addresses may be reserved for C-MAP BSSIDs. AP1 and APs in the candidate set may agree to use one value as their candidate set group BSSID when they form the candidate set. APs may include this group BSSID in their Beacon frame so STAs may know this group BSSID. AP1 may set TA field as the candidate set group BSSID. AP1 may also indicate its own BSSID in another field in CTI frame.

(3) With either method, a STA which is associated to AP1 may know the frame may be for other APs. The STA may also know the frame may be used to set up C-MAP transmission later. A STA which is not associated to AP1 but associated to one of the AP in the AP candidate set may continue monitoring the frame exchange between APs for the potential C-MAP DL transmission. A STA which is not associated to any AP in the AP candidate set may stop decoding the sequence and set NAV based on the duration field in MAC header or TXOP duration field in PHY header.

(iv) Receiver address (RA) field and association identifier (AID) fields in user info field: RA field is in MAC frame, which may be set to a broadcast MAC address. The CTI frame may carry one or more user info fields. Each user info field may carry an AID. In one method, the AID field may be set to the AP ID of a potential receiving AP in the AP candidate set. In one method, the AID field may be set to a reserved value to indicate all APs in the AP candidate group may be triggered by the CTI frame and transmit using assigned resource unit.

(v) C-MAP type: C-MAP type field may be in MAC header and/or PHY header. C-MAP type may be used to indicate different types of C-MAP transmissions to be used in the TXOP. Based on the value carried in C-MAP type field, the format and presence of CTI/CTR/CTAS/CTLS frames may be different. CTI frame may carry common information part and C-MAP type dependent part. In one method, the C-MAP frame exchange procedure and C-MAP resource allocation frame exchanges may be C-MAP type dependent. In one example, the C-MAP type may have:

(1) Coordinated OFDMA transmission
(2) Coordinated TDMA transmission
(3) Coordinated spatial reuse
(4) Coordinated sub-channel transmission
(5) Coordinated Beamforming and nulling
(6) Coordinated fractional FDMA (SR+OFDMA)
(7) Coordinated group-based transmission
(8) Coordinated joint transmission
(9) etc.

(vi) Primary 20 MHz channel and operating bandwidth: AP1 may announce its primary 20 MHz channel and operating bandwidth in a CTI, such as in 805. AP1 may also announce puncturing pattern for the TXOP.

(vii) Transmit power control: AP1 may announce the transmit power of each shared AP or the maximum allowed transmit power of each shared AP during the shared C-MAP TXOP.

(viii) Beamforming/precoding: AP1 may announce if beamforming or precoding may be allowed in the C-MAP TXOP.

c. At 810 of FIG. 8, the recipient/shared APs in the group may transmit a CAP TXOP Request (CTR) frame. In one method, the APs which intend to join the TXOP may transmit the CTR frame and the CTR frame transmission implicitly indicate they request to join the TXOP. In one method, the recipient APs may transmit the CTR frame. Each CTR frame transmitted by the APs may indicate if the AP requests to join the TXOP or deny the invitation to participate in the TXOP. In another words, the AP may use CTR frame, as in FIG. 8 at 810 to indicate it may not join or participate in the TXOP.

(i) Transmission of the CTR frame:

(1) Method 1: The APs may use the allocated resource units to transmit.

(2) Method 2: The APs may transmit the same CTR frame over the entire bandwidth. The transmission may be overlapped, but the with the duplicate frames.

(3) Method 3: One resource unit/subchannel may be reserved for all the APs which intended to join the TXOP to respond a CTR frame with the same common contents. The common contents may be copied and signaled from CTI frame. The duplicate transmission of the APs may extend the coverage range of the CTR transmissions so that more non-AP STAs may understand. The rest of the resource units/subchannels may be allocated to individual CTR transmissions where each transmitting AP may carry their individual information.

(4) Method 4: all the APs transmit part of preamble over the entire bandwidth. For example, the legacy preamble part, including L-STF, L-LTF, L-SIG field may be transmitted over the entire bandwidth even though each AP may be assigned to transmit over a narrower resource unit/subchannel. In this way, STAs in the coverage range of all the APs may hear the preamble part and may know the transmission is happening and hold their own transmission.

(ii) BSS color/BSSID:

(1) In one method, each AP may carry its BSS color in SIG field and BSSID in TA field of MAC header. Moreover, the AP may also carry the group BSS color and AP candidate set ID in PHY and/or MAC header.

(2) In one method, each AP may use group BSS color as its BSS color in PHY header and group BSSID as its BSSID in MAC header. Moreover, the AP may carry its own BSS color and BSSID somewhere in PHY and/or MAC header.
- (3) With either method, a STA which is associated to the AP may know the frame may be for other APs. The STA may also know if its associated AP may join C-MAP transmission later. If its associated AP may join the C-MAP transmission, the STA may continue monitoring the transmissions, otherwise, the STA may set NAV to the end of the TXOP. A STA which is not associated to AP1 but associated to one of the AP in the AP candidate set may continue monitoring the frame exchange between APs for the potential C-MAP DL transmission. A STA which is not associated to any AP in the AP candidate set may stop decoding the sequence and set NAV based on the duration field in MAC header or TXOP duration field in PHY header.
- (iii) In one method, each potential shared AP may transmit its suggested AP transmit power to the sharing AP. Sharing AP may determine the AP transmit power and set it to each shared AP in a later control frame (e.g., CTAS frame or trigger frame).
d. In FIG. 8 at 815, AP1 may transmit a CAP TXOP AP Schedule (CTAS) frame. This frame may confirm the AP list which may join the TXOP transmission based on the reception of CTR frames. This frame may carry resource allocation information for all the shared APs. In one method, depending on C-MAP type, the frame structure may be different. One or more of below information may be carried:
  - (i) CTAS frame may indicate the APs which may join the TXOP transmission. In one method, AP1 may announce the AP IDs or BSSIDs of these APs. In one method, AP1 may announce the AP candidate set ID and AP ID in the AP candidate set.
  - (ii) The frame may carry common info field and individual AP info field. TA field may be set to group BSSID or AP candidate set ID. RA field may be set to a broadcast address. Each AP ID may be carried in individual AP info field.
  - (iii) For each joint AP or all shared APs, AP1 may assign a transmit power or a maximum transmit power. In one method, AP1 may assign a target received RSSI (received signal strength indicator) level for each shared AP for uplink acknowledgement transmissions. Alternatively, each AP may calculate its desired receive RSSI based on its assigned transmit power and certain C-MAP rule.
  - (iv) For each joint AP, AP1 may assign one or more time/frequency resources for the AP to use.
  - (v) For all shared APs, AP1 may announce the DL/UL boundary for C-MAP transmissions so that all DL transmissions are synchronized, and all UL transmissions are synchronized. For example, AP1 may indicate DL length and UL length for the shared TXOP. DL length may be the value set for length field in L-SIG of DL PPDU transmitted from APs to STAs. UL length may be the value set for length field in L-SIG of UL PPDU transmitted from STAs to APs.
  - (vi) For all shared APs, AP1 may indicate the GI and LTF type for both DL and UL transmissions.
e. In FIG. 8 at 820, the recipient/shared APs may transmit a CAP TXOP Local Schedule (CTLS) frame.
  - (i) In one method, each shared AP may repeat the content carried in CTAS frame. The purpose of the CTLS frame is to inform STAs in its BSS of the allocated resources for this AP. The transmitted PPDU may be duplicated on all the subchannels.
  - (ii) In one method, the only the APs which may join the TXOP may transmit the CTLS frame.
f. In FIG. 8, at 825, AP1 may transmit a trigger frame to synchronize the DL transmission from the APs. In one method, AP transmit power and target received RSSI values for each shared AP may be carried in the trigger frame. In one method, some information carried in CTAS may be transmitted in the trigger frame. In one method, CTAS/CTLS exchanges may be omitted for some C-MAP type transmissions. And all information carried by CTAS may be transmitted in trigger frame.
g. In FIG. 8 at 830, APs may transmit DL PPDUs to their associated users. The APs may set L_length field carried in L-SIG as DL length carried in CTAS or Trigger frame. Each AP may perform DL OFDMA or MU-MIMO transmission to multiple STAs in its assigned time/frequency resource(s). The AP may truncate the PPDU so that it may not be longer than the DL length field indicated. The AP may pad the DL PPDUs so that it may end simultaneously at the boundary of DL length.
h. In FIG. 8 at 835, acknowledgement transmissions may be expected from the various STAs that have received DL transmissions from respective APs.
  - (i) In the case the C-MAP transmission may expect concurrent immediate acknowledgements, each AP may transmit a trigger frame to trigger multiple UL acknowledgements from its associated STAs. In the trigger frame, the AP may set UL length as UL length carried in CTAS or Trigger frame.
  - (ii) In the case the C-MAP transmission may expect sequential acknowledgement, each AP may poll acknowledgement from its associated STAs sequentially one after another. The AP ACK polling order may be determined by the sharing AP, or AP index in the AP candidate set. For example, after the DL transmission, AP1 may poll acknowledgements from its associated STAs first. After AP1 receives its ACKs, AP2 may poll acknowledgements from its associated STAs and so on.

Above mentioned procedure may be a baseline procedure. More information may be exchanged to improve the efficiency of C-MAP transmission. For example, with CTI/CTR exchange, one or more of below information may be exchanged:

BSS load indication: This indication may be a measurement for current BSS load. In one method, a newly defined BSS load indication may be utilized. In one method, an existing BSS load measurement or element may be utilized. The shared AP and potential sharing APs may exchange the BSS load information, so that the shared AP may allocate time/frequency resource between APs proportionally.

Low latency traffic indication: This indication may indicate how much low latency traffic is in currently the queue. The shared AP and potential sharing APs may exchange this information so that the shared AP may allocate more time/frequency resource for urgent traffic.

Transmit power control: this information may be used to control interference level of some STAs. The shared AP and sharing APs may exchange this information and control the transmit power of the APs to better control the interference level of STAs.

Network Allocation Vector (NAV) Setting:

In general, a group ID may be used to indicate the AP candidate set. Within the group, each individual AP may have its own ID, denoted as AP ID. STAs may use the group ID and AP IDs to set NAV. For example, a STA may check the group ID to determine if its associated AP may be part of the AP candidate set. If not, the STA may set NAV till the end of the TXOP. Otherwise, the AP may continue monitoring the transmissions. If it may detect its AP ID and knows the AP may request to participate the shared TXOP, the STA may continue monitoring the data transmission. Otherwise, the STA may set NAV.

Note, in this disclosure, we may use C-MAP and CAP interchangeably. The C-MAP and CAP may refer to coordinated multi-AP transmissions.

In one example, a C-MAP set may be identified by one or more BSS colors. The C-MAP set of APs may be identified by one BSS color, which may be indicated by one or more, or all member APs (which may be also be named candidate APs) in the C-MAP set. The member APs may include the BSS color that is associated with the C-MAP set in their beacons, short beacons, operating parameters, and/or any management or control frames or fast initial link setup (FILS) discovery frames. At the beginning of a shared TXOP, a member AP in the C-MAP set may have acquired the medium and decide that it may share with the TXOP with one or more member APs of the C-MAP set. It may send a CTI frame or any other frames or PPDUs to poll interests from other member APs including the BSS color for the C-MAP. One or more member APs that are interested in sharing the TXOP may send a CTR or any other frame or PPDUs to indicate their request for resources in the shared TXOP. The frame or PPDU may include the BSS color associated with the C-MAP set. Once the sharing AP collects all the resources request from member APs, it may send CTAS or any other frames or PPDUs, which may include BSS color associated with the C-MAP, and may also include an Excluded AP field. The Excluded AP field may contain the IDs of one or more member APs in the C-MAP set which are not participating in the shared TXOP. Such an Excluded AP field is used to indicate those BSS which are not participating in the shared TXOP. The IDs of the member APs in the C-MAP may be the BSSIDs of the APs, or AIDs or other AP IDs that are assigned to the member APs that are associated with the BSS color associated with the C-MAP. (The AIDs and/or the AP IDs and the associated BSS color identifying the C-MAP may be indicated by each of the member APs in the C-MAP set, e.g., in their beacon frames and/or other management or control frames).

In another example, the CTAS frame or other frames or PPDUs that are sent by the sharing AP may include a Participating AP field. The Participating AP field may contain a number of bits, with each bit associated with a member AP in the C-MAP field. If a bit in the Participating AP field is set to "1", it means that the associated member AP is participating in the shared TXOP; otherwise the bit is set to "0". The position of the bit in the Participating AP field may be indicated by each of the member APs in the C-MAP set, for example, in its beacon frame or other type of frames.

When the member APs in the C-MAP set receives the CTAS frame or any other type of frames or PPDUs, they may identify whether they are part of the shared TXOP.

In one example, each of the member APs may be triggered by the CTAS frame or other type of PPDUs, and may transmit CTLS or other type of frames or PPDUs. The CTAS frame or PPDU may include the BSS color associated with the C-MAP. The CTAS frame or PPDU may contain the Excluded AP field and/or the Participating AP field, which may be a copy of the same field from the CTAS frame or other type of frames or PPDUs received from the sharing AP.

In another example, only the member APs that are assigned by the CTAS frame or PPDU may be triggered by the CTAS frame or other type of PPDUs, and may transmit CTLS or other type of frames or PPDUs. The CTAS frame or PPDU may include the BSS color associated with the C-MAP. The CTAS frame or PPDU may contain the Excluded AP field and/or the Participating AP field, which may be a copy of the same field from the CTAS frame or other type of frames or PPDUs received from the sharing AP.

If a STA that are associated with a participating AP in the shared TXOP that have received the CTLS frame identified by the BSS color associated with the C-MAP and have examined the Excluded AP field and/or the Participating AP field to detect that its own AP participate in the shared TXOP, it may consider any future frames or PPDUs received containing the BSS color associated with C-MAP as intra-BSS frame/PPDU.

If a STA that are associated with a non-participating AP in the shared TXOP that have received the CTLS frame identified by the BSS color associated with the C-MAP and have examined the Excluded AP field and/or the Participating AP field to detect that its own AP does not participate in the shared TXOP, it may consider any future frames or PPDUs received containing the BSS color associated with C-MAP as inter-BSS frame/PPDU. It may also go into power saving for the duration of the indicated TXOP for the duration of the shared TXOP.

Embodiment 2: Group Based C-MAP Transmissions

Group Introduction

Figure 9:
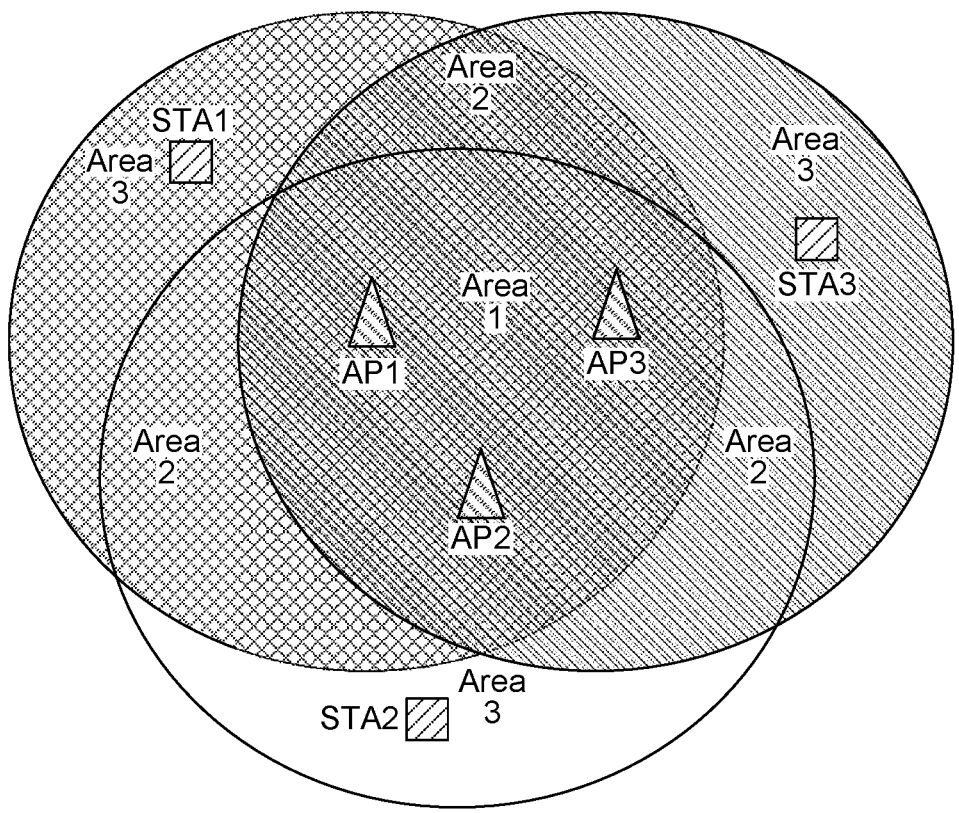
FIG. 9 depicts an example of STA groups using interference level in C-MAP system.

For a C-MAP transmission, within a BSS, STAs with different interference levels may form different groups. In FIG. 9, three APs (AP1, AP2, and AP3) each have their own respective coverage areas. Each AP is assumed to be in the center of its own circular coverage area. STA1 is shown within the coverage area of AP1. STA2 is shown within the coverage area of AP2. STA3 is shown within the coverage area of AP3. The three APs are shown having overlapping coverage areas. The intersection of all three areas is labeled Area 1 in FIG. 9. It is assumed that any STA located within Area 1 can hear any of the AP1, AP2, and AP3. For the multiple areas labeled Area 2 in FIG. 9, it is assumed, as an example, that any STA in any of the Areas 2 can hear two or more of the APs but not all of the APs. That is, a STA in any of the Area 2 intersections of the example of FIG. 9 may or may not be able to hear an AP that is furthest away from the STA. For the areas labeled Areas 3 in the example of FIG. 9, it is assumed that any STA, such as STA 1, STA 2, or STA 3, can hear only one AP. For example, STA3 can only hear AP3. Only three STAs are shown in FIG. 9, but it is expected that there may be any number of STAs in any of the Areas 1, 2, or 3. STAs in these areas may be considered as being organized as groups of STAs due to their location with respect to the APs. For example, three groups listed below may be considered (as shown in FIG. 9):

a. Group 1: STAs which can hear all the APs in the C-MAP transmission. Example: STAs in Area 1.
  b. Group 2: STAs which can hear two or more APs in the C-MAP transmission, but not in Group 1. Example: STAs in Area 2.
  c. Group 3: STAs which can hear one AP in C-MAP transmission. Example: STAs in Area 3.

With above mentioned STA grouping mechanism, C-MAP transmission may be more efficient. For example, Group 3 users may not observe interference from neighboring APs and thus APs may transmit using full time/frequency resources concurrently. Group 2 users may observe some interference from certain APs but not all the APs. C-MAP scheme may be designed to minimize the interference for these users and reuse some time/frequency resources.

There may be multiple ways to determine if a STA can hear an AP and it may be related to AP transmit power and transmit scheme as well. For example, with full transmit power, a STA may hear an AP, but with reduced transmit power, the STA may not hear the AP. Thus, with a different AP transmit power, the STA group mentioned above may be different. With and without beamforming transmission, the STA group may be different. Also, by controlling transmit power and transmit scheme, a group of APs may control the number of STAs in each STA group and which STA is in which group. Below, several methods to construct STA groups are given as examples:

a. A sharing (controlling) AP may have a list of STAs to serve in the shared TXOP. Based on the interference level of these STAs, the sharing/controlling AP may construct the STA groups by using power control for each shared AP in the C-MAP transmission. For example, the sharing AP may transmit to STA 1. By checking the interference level table of STA1, the AP may know AP2 may have limited interference to STA1. The sharing AP may limit the transmit power of AP2 so that STA1 may not observe a transmission from AP2.

b. A sharing/controlling AP may define the STA group by assigning Tx power for each shared AP. Based on the transmit power of each shared/participating AP in the C-MAP transmission, each AP may determine its STA group, and then, the sharing/controlling AP may choose which STAs to serve.

c. In any case, STAs need to have a way to measure and report (to associated AP) the signal power from all APs. The measurement may be RSSI, Pathloss and/or signal-to-interference-plus-noise ratio (SINR). Note, the measurement should be standardized measurement, which means the measurement should be comparable among APs and STAs. For example, if RSSI is used, then transmit power should be fixed so that RSSI values may be comparable.

Note, the terminology Group 1, Group 2 and Group 3 is used, however, the group number (index) may not need to be defined. Each shared/participating AP may determine its STA groups based on transmit power of C-MAP APs and reported interference level from the STA.

In one method, if the C-MAP transmission is selected/determined during a period, e.g., TXOP, the STA groups may be fixed during the period after the shared/participating APs are selected and transmit power and scheme of each AP are fixed.

In one method, a STA may measure the RSSI from each neighboring APs, and report to the associated AP when necessary. The measurement may be valid if certain conditions may be met. For example, the APs may use its full power to transmit and the transmission may be broadcast transmission without beamforming. The STA may report following information:
  a. STA ID
  b. AP IDs and associated RSSIs measured by the STA In one method, a STA may estimate the Pathloss from each neighboring APs, and report to the associated AP when necessary. The measurement may be valid if certain conditions may be met. For example, the APs may carry their transmit power in the frame to be measured and the transmission may be broadcast transmission without beamforming. The STA may report following information:
  a. STA ID
  b. AP IDs and associated Pathloss values estimated by the STA To minimize the overhead of the report, in one method, a STA may report the quantized RSSI or estimated Pathloss to the AP. N RSSI or Pathloss levels may be predefined/specified and the STA may need to report which category the received RSSI or the estimated Pathloss it observes. For example, the RSSI levels high, medium, and low may be predefined with RSSI ranges. The STA may report to its associated AP that it may hear AP1 with high RSSI; AP2 with medium RSSI; AP3 and AP4 with low RSSI.

The report may be carried in a management frame; an element; a control frame; or EHT control field in MAC header. A STA may report these to AP when it initially associates with the AP or it may observe changes of one or more measurement. In the case a STA may have more information to report than that can be carried within one frame/element/control field, the STA may split the report to multiple pieces. In one method, one field/subfield in the report may be used to indicate more report pieces may follow.

The AP, which receives the reports from STAs may save them in a table or other type of data structure. For example, the AP may create one table for each neighboring AP or APs in the AP candidate set. Note, the AP candidate set may be a set of APs which may group together to perform C-MAP transmissions. In this table, one entry may be STA ID, observed RSSI or Pathloss. In one method, the table entries may be ordered using RSSI values or Pathloss values. The table may be modified when new report received. In this disclosure the table may be referred as interference level table.

C-MAP Procedure for Group 1 Users

Group 1 users associated with an AP are the STAs which are associated with the AP and can hear transmission from all the APs in the C-MAP transmissions. The Group 1 users may be determined when the APs in the C-MAP are selected and the transmit power/scheme of the APs are determined. The APs in the C-MAP transmissions may need to share the time/frequency resource to transmit to their own Group 1 users. However, the transmission from all the APs can be heard from all the STAs. This implies that frame exchanges between APs, which may be utilized to set up the C-MAP transmission, may be detected by the STAs. This feature may be used to simplify some procedures. For example, sharing AP and shared APs may be allowed to have different BW and primary channels. If the primary channel of the STA may belong to the operation bandwidth of the sharing AP, the STA may be able to decode the frames from the beginning of the TXOP. Thus, the STA may be able to prepare the reception or go to sleep or power save mode easily.

Figure 10:
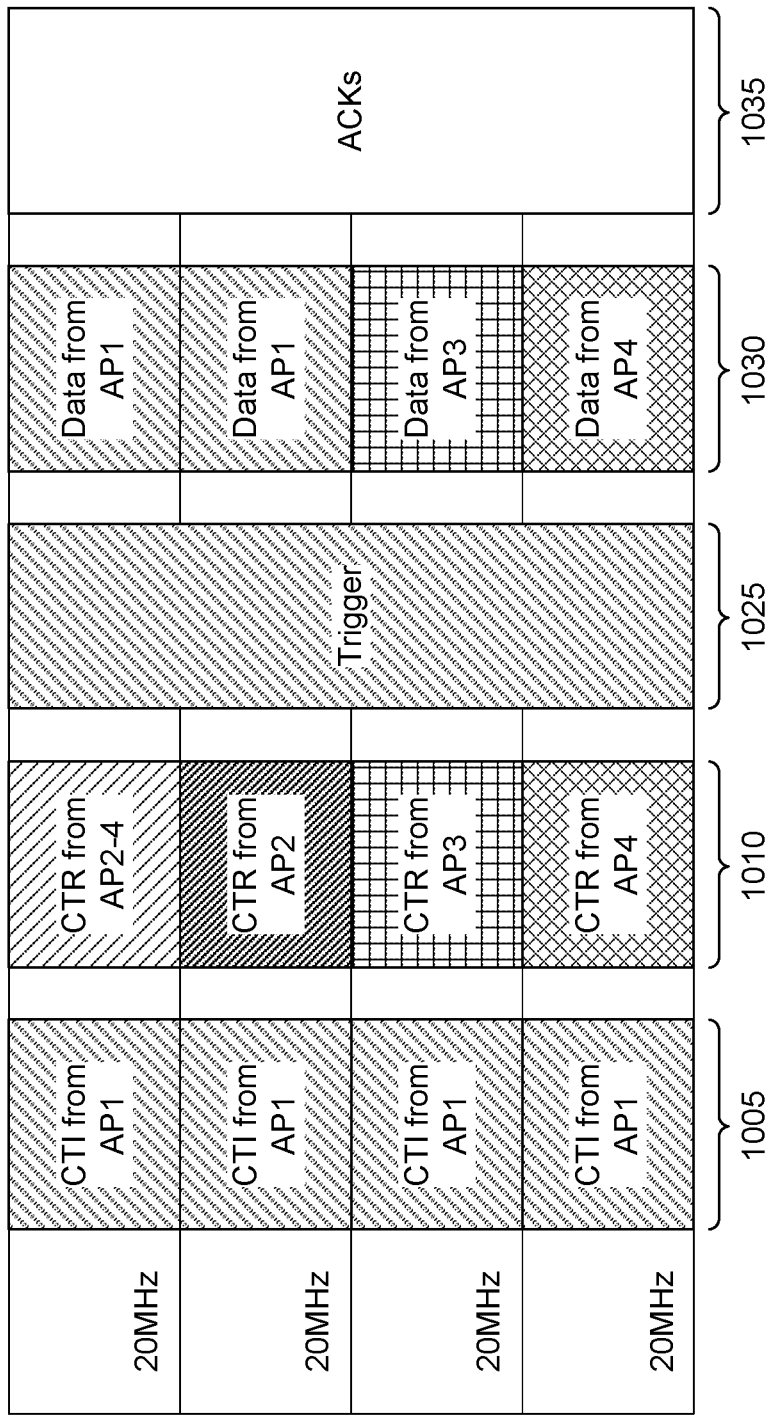
FIG. 10 depicts an example procedure for C-MAP transmission with Group 1 users.

If the C-MAP transmissions may target to a Group 1 user, the general procedure defined in FIG. 8 may be utilized with below modifications shown in FIG. 10:
  a. In FIG. 10 at 1005, CTI from AP1, the sharing/controlling AP, may indicate the upcoming C-MAP may be used for Group 1 users of each shared AP. AP1 may also indicate the AP transmit power and if Beamforming/power enhanced precoding scheme is allowed in the C-MAP DL transmissions, so each AP may determine their Group 1 user. In one method, the transmit power of each AP may be the same. In one method, the transmit power of each AP may be different and assigned by the sharing AP. AP1 may transmit CTI frame using the same transmit power as it may use later in the C-MAP transmission. AP1 may also announce its primary 20 MHz channel location and operating bandwidth, and/or puncturing for the TXOP. The transmission of CTI frame may be duplicated on each 20 MHz channel.

(i) STAs which detect the CTI transmission may know the upcoming C-MAP transmission may be for Group 1 users. The STA may check the group BSS color and BSS candidate set ID or group BSSID to determine if it may belong to the BSS candidate set. If it may not in the BSS candidate set, it may set NAV and go to power save mode or sleep mode until the end of the TXOP. If it may be in the BSS candidate set, and it may detect the CTI transmission, it may be Group 1 user for its associated AP. The STA may know the primary 20 MHz channel location and operating bandwidth for the TXOP. The STA may continue monitoring the upcoming CTR transmissions. The STA may monitor the transmission on the entire operating bandwidth, or the primary x MHz channel which includes the primary 20 MHz channel. Here x may be 80, 40 or 160.

b. On reception of the CTI, each potential shared AP may check the AP transmit power assigned in the CTI and determine its potential Group 1 users and corresponding traffic for the users. For example, based on the transmit power of shared AP and each potential sharing AP, and saved interference level table, the AP may calculate or estimate the received RSSI of each STA from an AP, $$RSSI\_APi\_STAj = Tx\_APi - Pathloss\_APi\_STAj$$

where Tx_APi is the transmit power of APi and Pathloss_APi_STAj is the Pathloss between APi_STAj reported by the STAj. If the RSSI_APi_STAj is above a predefined/predetermined threshold, the AP may determine STAj may hear the transmission from APi. If the AP may determine to join the C-MAP TXOP, the AP may respond CTR frame. The AP may transmit CTR frame at 1010 in FIG. 10 using the transmit power assigned by the sharing AP, or AP1.

(i) STAs which detect one or more CTR transmission may know the upcoming C-MAP transmission may be for Group 1 users. The STA may check the group BSS color and BSS candidate set ID or group BSSID to determine if it may belong to the BSS candidate set. If it may not in the BSS candidate set, it may set NAV and go to power save mode or sleep mode until the end of the TXOP. If it may be in the BSS candidate set, and it may detect the CTR transmission(s), it may be Group 1 user for its associated AP. The STA may continue monitoring the upcoming transmissions.

c. On reception of CTRs, AP1 may know which AP may join the TXOP. AP1 may transmit a CTAS frame (not shown in FIG. 10), in which it may carry information mentioned with respect to FIG. 8. Herein below are highlighted some information fields and the usage of these information fields:

(i) For each joint AP or all shared APs, AP1 may assign a transmit power or a maximum transmit power. In one method, AP1 may assign a target received RSSI level for each shared AP for uplink acknowledgement transmissions. Alternatively, each AP may calculate its desired receive RSSI based on its assigned transmit power and certain C-MAP rule.

(1) An STA which receives CTAS may know the sharing AP and shared APs for the TXOP. The STA may check its reported interference level of each AP and determine if it belongs to Group 1 user. If not, the STA may set NAV to the end of the TXOP and go to sleep mode or power save mode. Otherwise the STA may check the allocated time/frequency resource for its associated AP and monitor the time/frequency resource.

d. Each shared AP may transmit CTLS frame (not shown in FIG. 10). The content of CTLS may be from CTAS frame. In one method, the CTLS frame from each AP may be the same as each other.

e. In FIG. 10 at 1025, the sharing/controlling AP1 may transmit a trigger frame to synchronize the transmission between the APs. In one method, AP transmit power and target received RSSI values for each shared AP may be carried. In one method, some information carried in CTAS may be transmitted in the trigger frame. In one method, CTAS/CTLS exchanges of FIG. 8 may be omitted for Group 1 users as shown in FIG. 10. And all information carried by CTAS may be transmitted here in trigger frame.

f. Shared/participating APs may transmit DL PPDUs to its Group 1 users at 1030. The APs may set L_length field carried in L-SIG as DL length carried in CTAS or Trigger frame. Each AP may perform DL OFDMA or MU-MIMO transmission to multiple STAs. The AP may truncate the PPDU so that it may not be longer than the DL length field indicated. The AP may pad the DL PPDUs so that they may end simultaneously as DL Length indicated. In the case the C-MAP transmission may expect concurrent immediate acknowledgements at 1035, each AP may transmit a trigger frame to trigger multiple UL acknowledgements from its associated STAs. In the trigger frame, the AP may set UL length as UL length carried in CTAS or Trigger frame.

C-MAP Procedure for Group 3 Users

Group 3 users associated with an AP are the STAs which are associated with the AP and can hear transmission from only their associated AP in the C-MAP transmissions. The Group 3 users may be determined when the APs in the C-MAP are selected and the transmit power/scheme of the APs are determined. The APs in the C-MAP transmissions may be able to reuse the time/frequency resource to transmit to their own Group 3 users since Group 3 users may not hear transmissions from APs other than associated APs.

Figure 11:
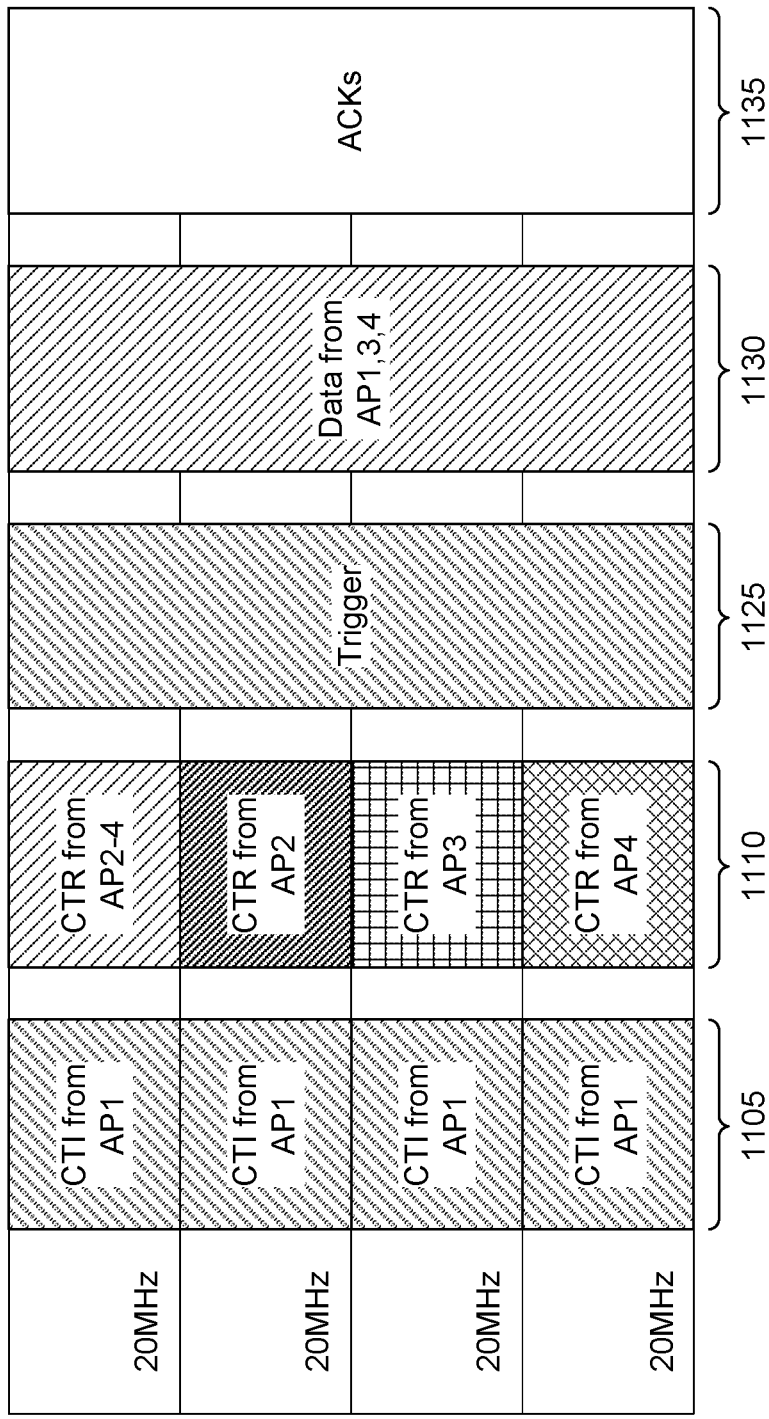
FIG. 11 depicts an example procedure for C-MAP transmission with Group 3 users.
Figure 12:
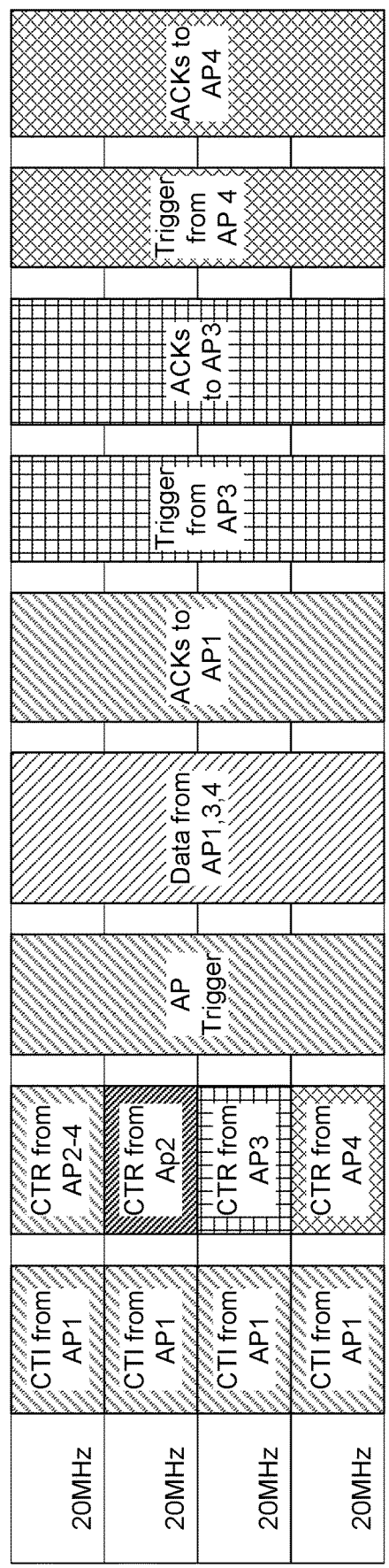
FIG. 12 depicts an example of Sequential ACK transmissions.
Figure 13:
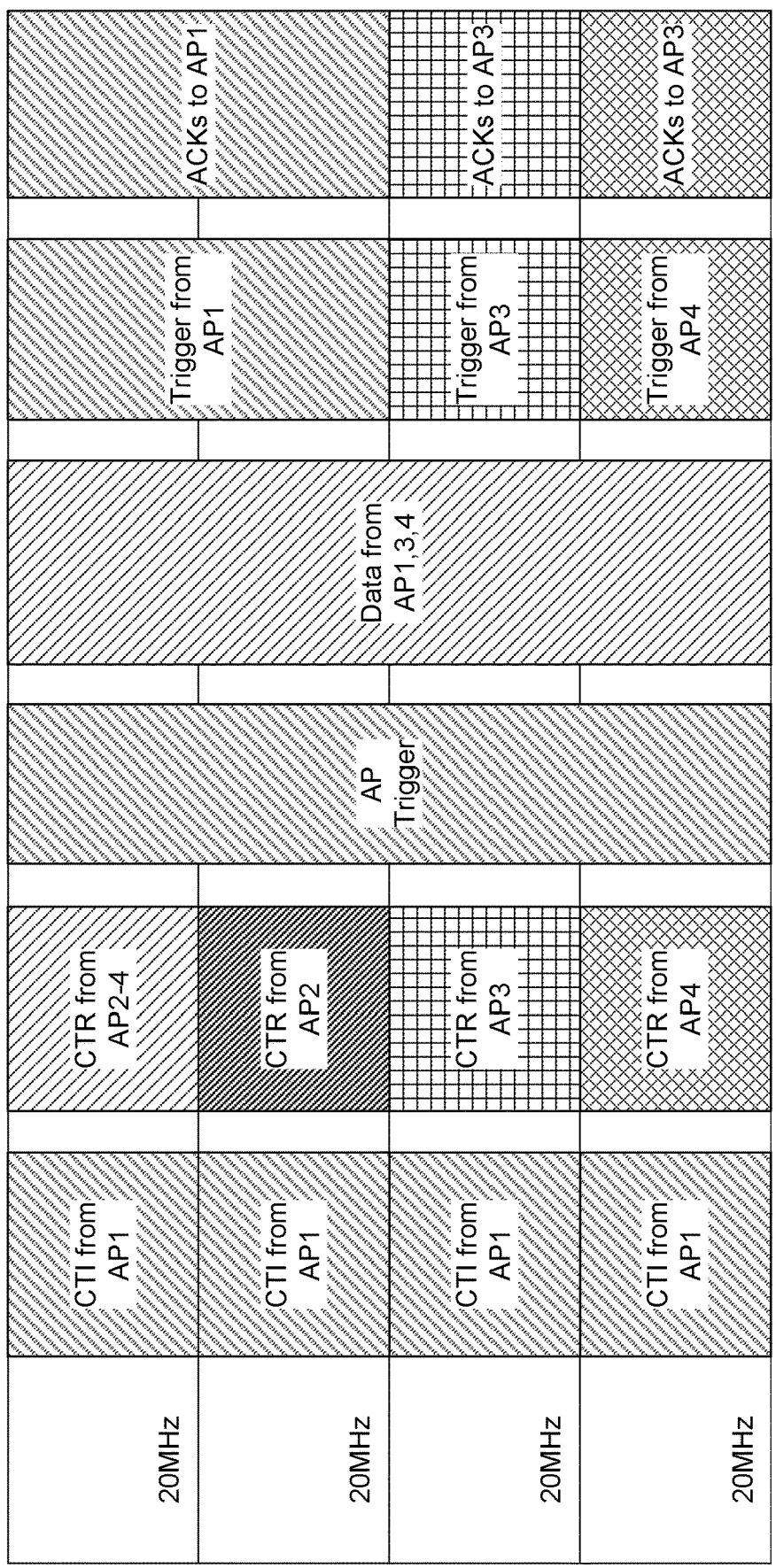
FIG. 13 depicts an example of Concurrent ACK but in different frequency resources.

If the C-MAP transmissions target to a Group 3 user, the general procedure defined in FIG. 8 may be utilized. Alternatively, since Group 3 users may share the entire frequency/time resources and no resource allocation may be needed, a simplified procedure shown in FIG. 11 may be used:

a. In FIG. 11 at 1105, a CTI frame transmission from AP1, the sharing/controlling AP, may indicate the upcoming C-MAP may be used for Group 3 users (STAs of AP-1, AP-2, AP-3, and/or AP-4) of each shared/participating AP. AP1 may also indicate the AP transmit power and if Beamforming/power enhanced precoding scheme is allowed in the C-MAP DL transmissions, so each AP may determine their Group 3 users. In one method, the transmit power of each AP may be the same. In one method, the transmit power of each AP may be different and assigned by the sharing/controlling AP. For example, sharing/controlling AP1 may transmit with full power, and the rest of APs may transmit with lower power. In this way, AP1 may reach more users in its BSS. AP1 may transmit a CTI frame using the same transmit power as it may use later in the C-MAP transmission. AP1 may also announce its primary 20 MHz channel location and operating bandwidth, and/or puncturing for the TXOP. The transmission of a CTI frame may be duplicated on each 20 MHz channel.
   (i) Group 3 STAs may or may not receive the frame exchanges between APs.
   (ii) Unintended STAs may set NAV accordingly.
 b. On reception of the CTI, each potential shared AP may check the sharing/controlling AP transmit power assigned in the CTI and determine its potential Group 3 users and corresponding traffic for the users. For example, based on the transmit power of shared AP and each potential sharing AP, and saved interference level table, the potential shared AP may calculate or estimate the received RSSI of each STA from an AP, $$RSSI\_APi\_STAj = Tx\_APi - Pathloss\_APi\_STAj$$

where Tx_APi is the transmit power of APi and Pathloss_APi_STAj is the Pathloss between APi_STAj reported by the STAj. If the RSSI_APi_STAj is above a predefined/predetermined threshold, the AP may determine STAj may hear the transmission from APi. The AP may determine to join the TXOP based on several criteria. For example, if the potential shared AP has Group 3 users and it has traffic to the Group 3 users the potential shared AP may join the TXOP. If the AP may determine to join the C-MAP TXOP, the AP may respond by transmitting a CTR frame in response to a received CTI frame. The responding (shared/participating) AP may transmit a CTR frame at 1110 in FIG. 11 using the transmit power assigned by the sharing AP, or AP1. In one method, each potential shared AP may be able to suggest a transmit power for itself to AP1. AP1 may determine the transmit power for each shared AP and announce that in a later frame.
   (i) Group 3 STAs may or may not receive the frame exchanges between APs.
   (ii) Unintended STAs may set NAV accordingly.
Note that in FIG. 11, each potential shared AP (AP-2, AP-3, AP-4), upon receiving CTI from the sharing/controlling AP (AP-1) may confirm or deny the C-MAP TXOP. The sharing AP (AP-1) is informed which APs know which join/participate the TXOP by receiving the CTRs from each of the potentially shared APs (AP-2, AP-3, AP-4). In the instance of FIG. 11, AP-2 denies the opportunity to share in a TXOP. AP-3 and AP-4 join with the AP-1 and participate in the TXOP.
 c. On reception of CTRs, AP1 may know which AP may join the TXOP. AP1 may transmit a trigger frame at 1125 to trigger multiple AP concurrent transmission. The trigger frame may carry shared AP IDs, an AP group ID, and a TXOP duration, and resource allocations for each joining AP. The trigger frame may carry transmit power for each AP, DL length/duration) and UL length/duration, target RSSI for UL transmissions (e.g., UL ACKs) for each AP, LTF and CP setting etc. In one method, the UL ACK transmission options may be carried. For example, if UL ACK may be transmitted concurrently or sequentially.
   (i) Group 3 STAs may or may not receive the frame exchanges between APs.
   (ii) Unintended STAs may set NAV accordingly.
 d. On reception of the trigger frame, each sharing or shared AP may determine its Group 3 STAs based on given transmit power and interference level table. The AP may use the entire bandwidth to transmit data at 1130 to one or more Group 3 STAs using OFDMA. For example, AP-1, AP-3, or AP-4 may transmit its data in the TXOP on a formed 80 MHz channel or a subset to their determined Group 3 STAs. The transmitting AP (either the controlling AP or a participating AP) may need to align its DL transmission with that from the other APs in the TXOP and also align upcoming UL transmission with that from the other APs too. The AP may have its DL transmission within time duration indicated by DL length field. At 1135, for upcoming ACK transmissions, the APs may:
   (i) Allow concurrent UL ACK transmission. Each AP may transmit a trigger frame at the end of the DL transmission to trigger UL ACKs. Each AP may allocate the entire bandwidth to its STAs for UL ACK transmission in an OFDMA way. Multiple APs may pad the DL transmission properly so that they may end at the same time so the UL ACK transmissions may start at the same time. The APs may indicate the UL length in the trigger frame so the UL ACKs may end simultaneously. Each AP may indicate in the trigger frame the target received RSSI so the transmission from STAs may not introduce interference to other APs.
   (ii) Poll/trigger ACK transmissions sequentially in different time slot. For example, AP1 may transmit a trigger frame to its STAs for uplink ACK/BA transmission over entire bandwidth (may be with UL OFDMA transmission) SIFS time after the DL transmission. Alternatively, the trigger frame may be transmitted together with data frame. UL length may be set as the same value indicated in AP Trigger frame transmitted by AP1 so the UL ACK/BA transmission may be within the time duration indicated by UL length. Next AP, e.g. AP3, knows the UL length since it was carried in the trigger frames transmitted by AP1, and can calculate the time to transmit its trigger frame even though it may not hear the UL ACK/BA transmission to AP1. AP2 may trigger UL ACK/BA transmissions over the entire bandwidth from its STAs and so on. An example of sequential ACK transmissions is shown in FIG. 12.
 e. Allow concurrent UL ACK transmission but STAs for different AP may use different frequency resources. For example, STAs transmit ACK/BA to AP1 may be in subchannel 1 or resource unit 1. STAs transmit ACK/BA to AP2 may be in subchannel 2 or resource unit 2 and so on. UL resource allocation corresponding to each AP may be carried in the trigger frame transmitted by AP1. An example of concurrent ACK transmissions is shown in FIG. 13.

Figure 14:
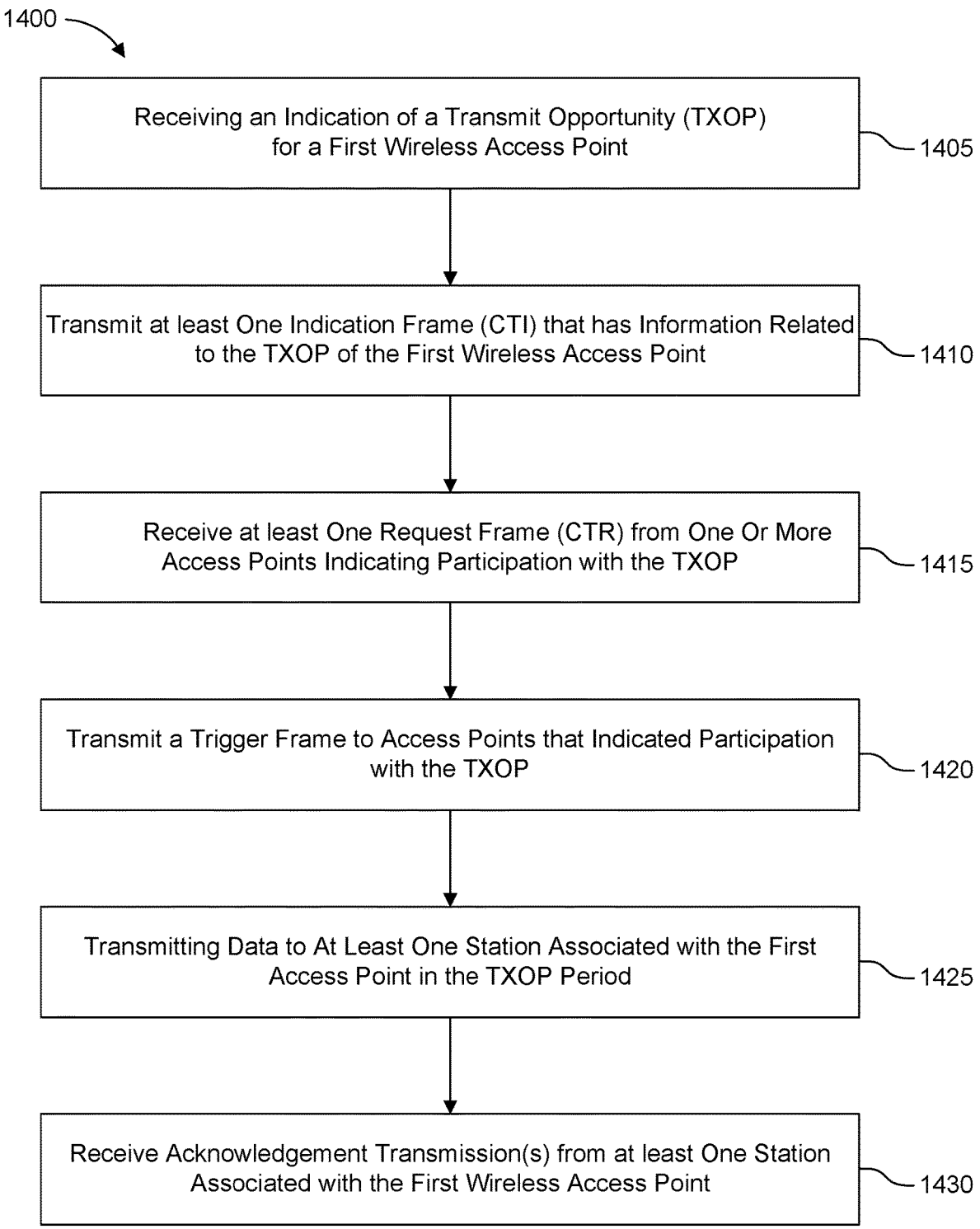
FIG. 14 depicts an example procedure for a Sharing AP.

FIG. 14 depicts an example C-MAP method for Group 3 users. The method 1400 may be performed by a first wireless access point in a network of multiple access points. The method 1400 may be considered a simplified procedure of FIG. 8 and thus has elements in common with FIG. 8. In the method of FIG. 14, the first wireless AP may be a sharing/controlling AP that coordinates a multi-access point transmission in a system/network of multiple other wireless access points, such as shared/participating APs. The FIG. 14 method derives from activities described with respect to FIG. 11.

At 1405, the first wireless AP receives an indication of or otherwise obtains a transmit opportunity (TXOP) in a wireless medium of the network. The first AP acts as a sharing/controlling AP and intends to share the TXOP with other APs in the network. At 1410, the first AP transmits an indication frame of a TXOP, such as a CAP TXOP Indication (CTI) frame, that includes information related to the TXOP to the other multiple access points connected in the network wireless medium. This may be analogous to the AP transmission of CTI frames at 805 of FIG. 8.

At 1415 of FIG. 14, the first wireless AP receives at least one request frame (CTR) from one or more access points of the multiple access points to participate with the TXOP obtained by the first wireless access point. The first wireless AP receives at least one indication frame from APs that indicate a participation (a response to participate) with the TXOP of the first wireless AP. In one example, multiple CTR request frames may be received, one from each of the other APs on the network that received the indication frame (CTI frame) that was transmitted by the sharing/controlling first AP. The participating APs are APs that have received the indication frame, such as the CTI frame. The received CTR frames of FIG. 14 may be analogous to the received CTR frames at 810 in FIG. 8. At 1420 the sharing/controlling AP (first AP) transmits a trigger frame to the participating access points (APs that indicated a participation in the TXOP) in the wireless network. The trigger frame may include respective power levels for the participating access points. The AP transmitted trigger frame of FIG. 14 may be analogous to the transmitted trigger frame at 825 in FIG. 8.

At 1425, the sharing/controlling first AP transmits downlink data to associated stations of the first access point. It is noted that the sharing/participating APs may also use the shared TXOP period for transmitting downlink data to stations (STAs) associated with their specific APs. The first AP transmission of data of FIG. 14 may be analogous to the transmission of data in TXOP period at 830 in FIG. 8. At 1430, the sharing/controlling AP (first AP) receives at least one acknowledgement from stations associated with the first AP. The at least one acknowledgement (ACK) results from the associated stations properly receiving the downlink data transmission of the first AP. The first AP reception of ACKs of FIG. 14 may be analogous to the reception of ACKs at 835 in FIG. 8

It is noted that the method 1400 may involve the controlling APs as well as the participating APs because, during the TXOP period, the participating APs may also transmit downlink data to their respective stations. Likewise, after those stations properly receive the downlinked data, each of those stations may transmits ACKs to the respective participating APs which receive the ACKs accordingly.

The method 1400 may also include the first AP initially receiving, from a plurality of stations, an indication of interference levels and determining station groups based on the received indications of interference levels of the plurality of stations. As such, the transmission of a trigger frame at 1420 may include transmitting the trigger frame with respective power levels including respective power levels indicating the station group based on/determined by the received indications of interference levels of the plurality of stations. The indication of interference levels of the multiple stations may be stored in the first access point in an interference level table. An indication of interference levels may include receiving a transmission of received signal strength indication, RSSI, from each station, or at least a number of stations, in the wireless network.

In one embodiment, the first AP (sharing/controlling AP) may transmit at least one coordinated multi-access point transmit opportunity indication frame, CTI, transmitted in a physical protocol data unit to a candidate set of access points, wherein the indication frame is transmitted to the candidate set in multiple channels simultaneously.

In one embodiment, the first AP (sharing/controlling AP) may receive at least one coordinated multi-access transmit opportunity request frame, CTR, from one or more of the multiple access points to participate with the transmit opportunity of the first wireless access point, wherein the request frames are received in multiple channels simultaneously.

As indicated hereinabove, FIG. 11 represents a simplified version of FIG. 8. Thus, the FIG. 11 or FIG. 14 procedure may in one embodiment, be augmented with elements of FIG. 8. In that embodiment, after receiving at least one request frame, the first AP may transmit at least one schedule frame, such as a CTAS frame as in 815 of FIG. 8 to confirm a grant of joining the transmit opportunity and providing resource allocation information to the participating access points. There, the schedule frame may include basic service set identification or access point identification information, and time and frequency information for a downlink transmission. As shown in FIG. 8 at 820, a local schedule frame may be transmitted by the participating APs to their respective associated STAs and may be received by the first AP.

In one embodiment compatible with the disclosure herein, such as in FIGS. 6, 8, 10, 11, and 14 and their descriptions, a method may be performed by an access point that is to share a transmit opportunity (TXOP) with other access point in a wireless network of multiple access points. In the embodiment, the access point, being a sharing/controlling AP and/or the shared/participating APs, may receive, from multiple stations (STAs), an indication of interference levels, the interference levels determined by the STAs themselves. The AP may then generate a station group to receive a downlink transmission from an associated access point during the shared transmit opportunity. The station group may be determined based on the received interference levels of the multiple station interference levels. The sharing/controlling AP may then control a transmit power level from the access point to target the generated station group during the shared transmit opportunity.

C-MAP Procedure for Group Combinations
Sharing AP Allocated Spatial Reuse (SR) Resource The Sharing AP may specify which time/frequency resource can be shared using spatial reuse by which shared APs. For example, in FIG. 14, Sharing APa announces in the TXOP sharing procedure a frequency sharable resource Data-SR (after trigger frame) can be spatially reused by {APa, APb, APc}, which is denoted as eligible AP set for sharable resource Data-SR. The announcement of eligible AP set, and the spatial-reuse sharable resource can be announced in the CTI, CTLS or trigger frames as shown in FIG. 14.

Based on the eligible AP set, each shared and sharing AP may determine their associated STAs suitable for reception in the spatial-reuse sharable resource (e.g. Data-SR). The criteria for each AP to determine the suitable STAs to be scheduled in the TXOP is based on the channel state/RSSI measurement reports provided by the associated STAs. For example, an AP j determines an associated STA x as a suitable STA to be scheduled in spatial-reuse sharable resource Data-SR if.

(a) AP j is in the "eligible AP set for sharable resource Data-SR" announced by the sharing AP, and
(b) STA x has reported no APs from the 'eligible AP set for sharable resource Data-SR' announced by the sharing AP, except the associated AP j For another example, in the CTI, CTAS, or Trigger frame in FIG. 14, the sharing AP may additionally specify each AP k a TX power limit $P_{max,k}$ in the "eligible AP set for sharable resource Data-SR". If an associated STA x of AP j has reported a pathloss to AP i as $PL_{i,x}$ (or the AP j calculated pathloss from reported RSSI from STA x and tx power of AP i), which was based on signals from AP i measured in the sub-channel containing sharable resource Data-SR by STA x, the AP j may determine the STA x as a suitable STA to be scheduled in spatial-reuse sharable resource Data-SR if:

AP j is in the 'eligible AP set for sharable resource Data-SR' announced by the sharing AP, and either STA x has reported no APs from the 'eligible AP set for sharable resource Data-SR', except the associated AP j, or $P_{max,i} - PL_{i,x} < \delta$ for every AP i in the 'eligible AP set for sharable resource Data-SR', except the associated AP j, where δ is a configurable threshold.

Figure 15:
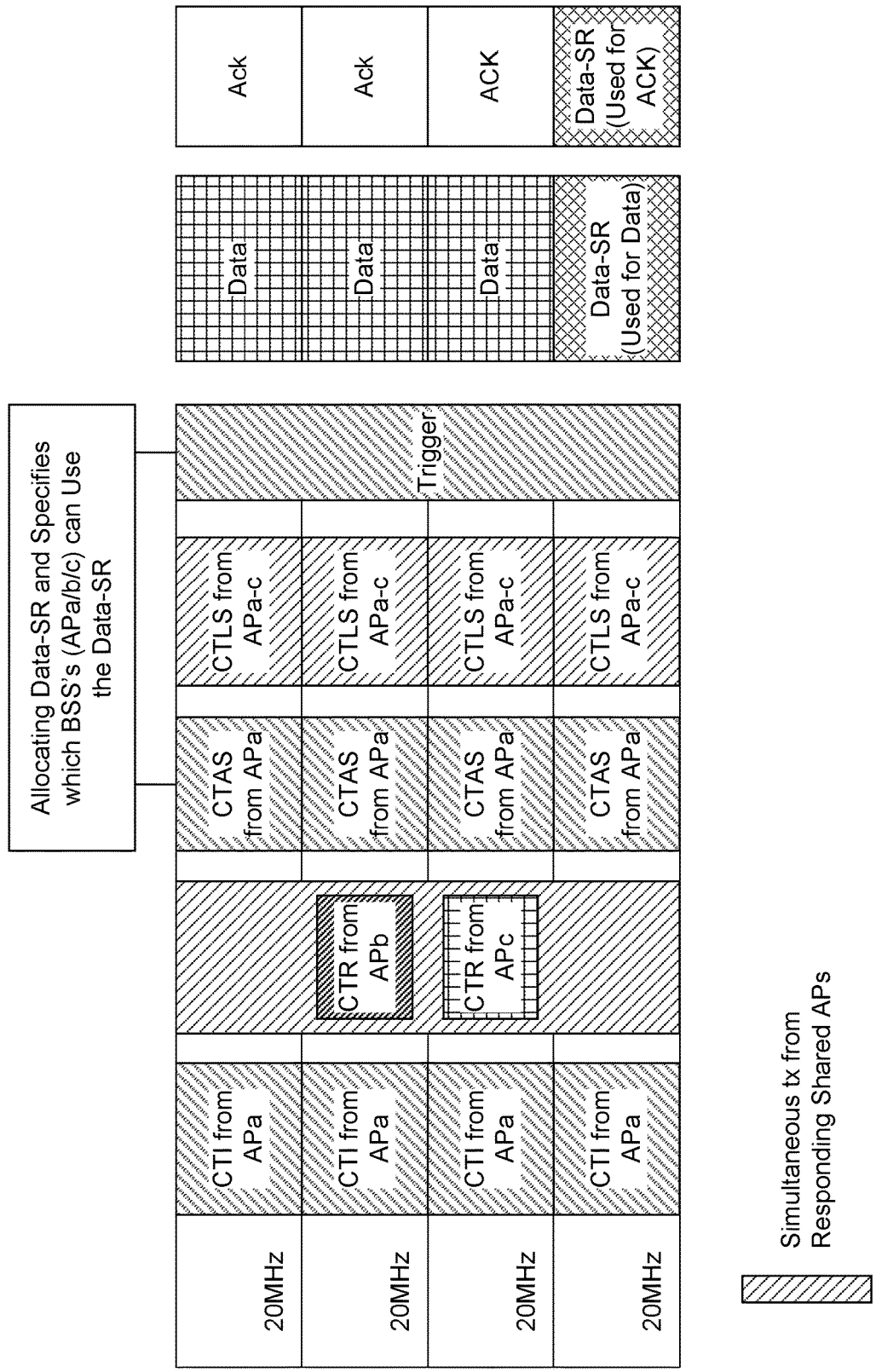
FIG. 15 depicts an example of Sharing AP allocated SR resource.

For yet another example in FIG. 14, the "eligible AP set for resource Data-SR" is {APa, APb, APc}. For APa, the suitable STAs for this resource Data-SR are the STA which has reported to the associated APa about no reception of APb, APc's signals. The signal used for the reporting/measurement could be the Beacon frame sent or other frames sent by the measured APs as described in Embodiment 2 Group Introduction above. Likewise, for APb, the suitable STAs for this resource Data-SR are the STAs which have reported no reception of APa, APc's signals. FIG. 15 illustrates the possible locations of suitable STAs when the 'eligible AP set for sharable resource Data-SR' is {APa, APb, APc}. Using the terminology in previous sections, these are the STAs in Group 3 area.

In FIG. 14, the sharing AP sends CTI frame in duplicate in an 80 MHz BW. The CTI frame contains the frequency resource for shared APs APb, APc, APd to reply CTR frames, which indicates the shared AP's intention to participate in the TXOP sharing and their requests for resources. Each shared AP may have the same or different primary channels. As described in Embodiment 2 Group Introduction above, several methods can be employed to keep the AP's primary channel busy while the AP is transmitting CTR frame on another 20 MHz channel. The sharing AP sends CTAS frames in duplicate to assign resource (e.g. 20 MHz sub-channel) to each shared AP which has replied CTR frames. In this example APd has not replied a CTR frame due to clear channel assessment (CCA) busy. Sharing AP determines a 20 MHz sub-channel to be spatially shared by the replied APb, APc, and itself. In the CTAS frame, in addition to assigning a 20 MHz subchannel to be used exclusively by APb and APc, a sharable resource for SR (Data-SR), and the eligible AP set for the sharable resource {APa, APb, APc} can also be announced. After receiving CTAS frame, all shared APs which has been assigned resource by sharing AP transmits identical CTLS frames, which announces to their own associated STAs the sub-channel each AP is transmitting and receiving. In the case of the sharable resource, the CTLS frame may also conveys the location of the sharable resource to the associated STAs. Alternatively, the CTLS frame may require STAs to receive in 80 MHz BW for receiving data either from the subchannel exclusively assigned to the BSS by sharing AP, or from the sharable resource spatially shared by multiple APs. The trigger frame is sent by sharing AP to align the OFDMA transmissions from multiple APs. If sharable resource for SR (Data-SR), and the eligible AP set for the sharable resource {APa, APb, APc} was not announced in CTAS frame, it can be announced in the Trigger frame. After Trigger frame, sharing and shared APs transmitting DL frames in its assigned sub-channel and possibly in the sharable sub-channel. As described in the previous paragraphs, suitable STAs are determined by each AP in the eligible AP set, and the suitable STAs can be scheduled by each AP in the eligible AP set for reception in the sharable sub-channel (Data-SR).

AP Determining Sharable Spatial Reuse (SR) Resource from Allocated Per-BSS OFDMA/TDMA Resource by Sharing/Controlling AP.

Figure 16:
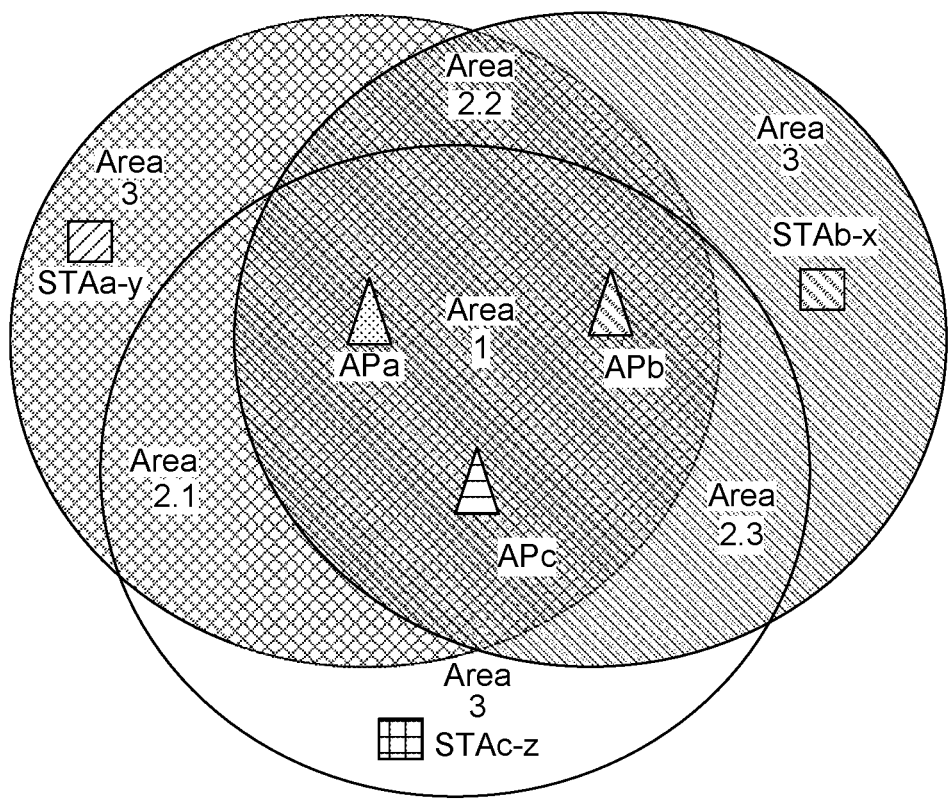
FIG. 16 depicts an example of eligible STAs for the set {APa, APb, APc}.
Figure 17:
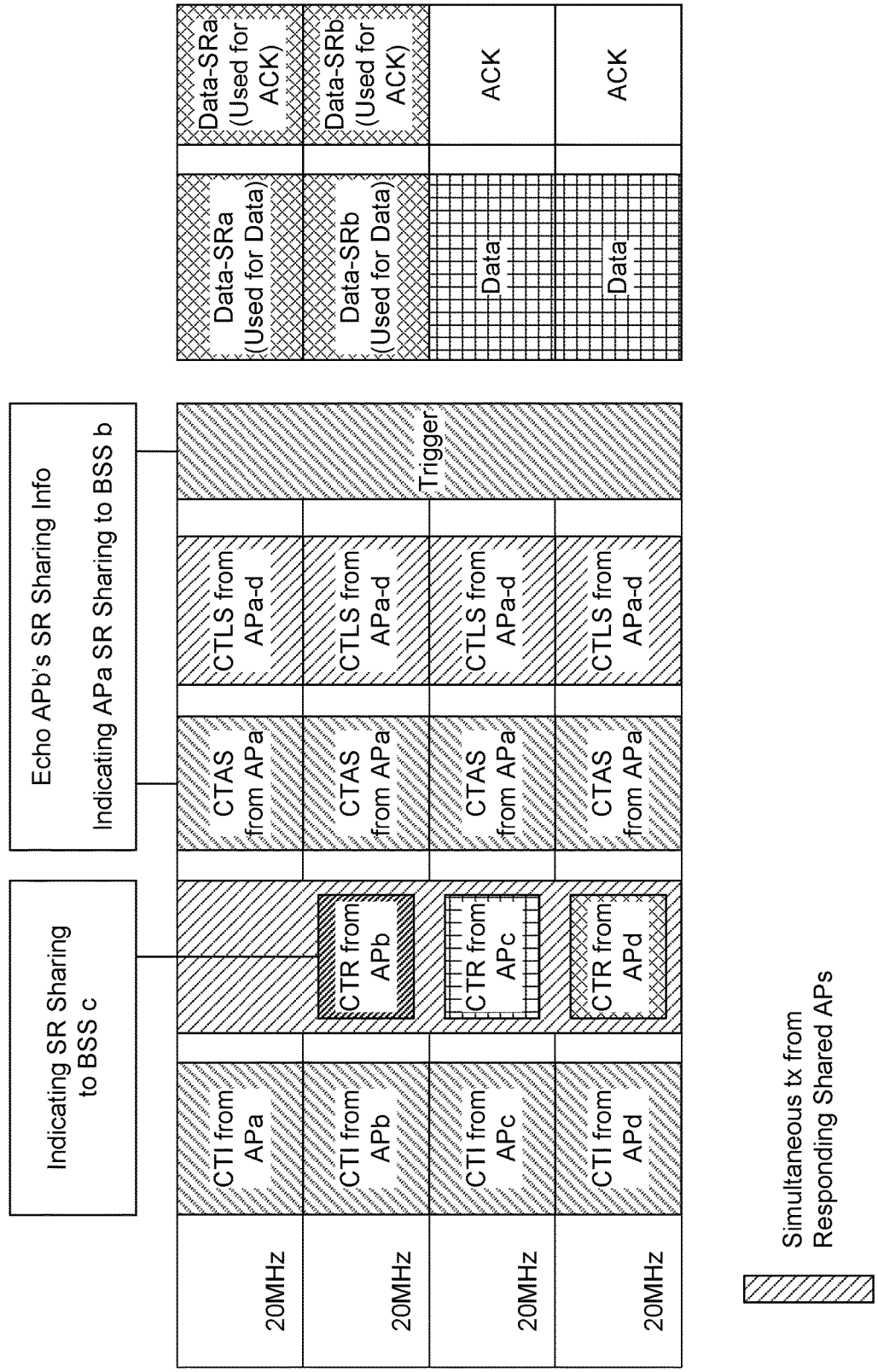
FIG. 17 depicts an example of Sharing or shared AP shared SR resource.
Figure 18:
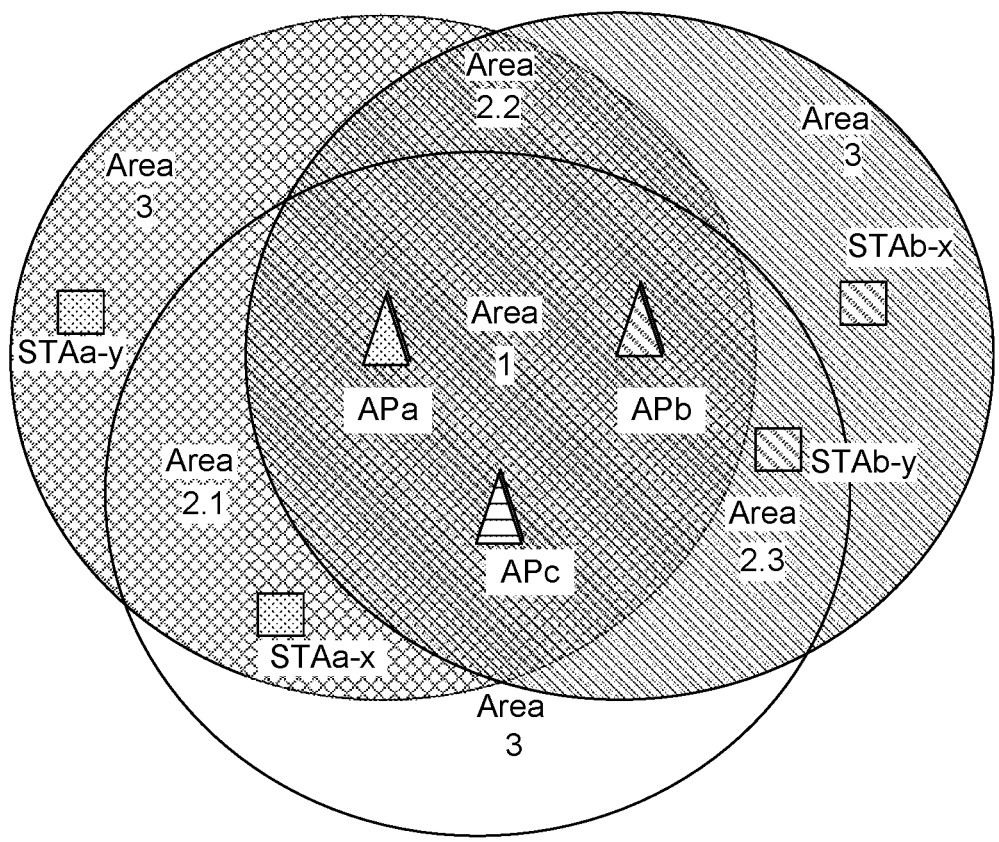
FIG. 18 depicts an example of eligible STAs for the set {APa, APb}.

A Sharing/Controlling or Shared/Participating AP may specify whether (a portion of) time/frequency resource exclusively assigned to itself (via the procedure described in the previous section entitled Sharing AP allocated Spatial Reuse (SR) resource) by sharing AP can be shared by other APs. For example in FIG. 16, The Shared APb indicates to the sharing AP in the CTR frame the yet to be assigned exclusively resource (to be assigned by the Sharing AP) can be shared by {APb, APc}, which is denoted as eligible AP set for resource assigned to APb. The Sharing APa indicates in the in the CTAS frame the assigned resource (to itself) can be shared by {APa, APb}, which is denoted as eligible AP set for resource assigned to APa. Because the Shared APb does not know which 20 MHz sub channel it may be assigned by the Sharing AP when transmitting the CTR frame, the eligible AP set for resource assigned to APb can be a list of different sets for each 20-MHz sub-channel. For example, eligible AP set for resource assigned to APb is {APb, APc} if the 1st 20 MHz within 80 MHz is assigned, {APb, APc} if the 2nd 20 MHz within 80 MHz is assigned, {APb, APd} if the 3rd 20 MHz within 80 MHz is assigned, {APb, APc} if the 4th 20 MHz within 80 MHz is assigned. The reason for different eligible AP set for resource assigned to APb may be because APb only wants to transmit to a STAx, which is out of range/area of APc but in the range of APd in the 1st and 2nd 20 MHz sub-channel, and is out of range/area of APd but in the range of APc in the 3rd and 4th 20 MHz sub-channel The criteria for a sharing/shared AP to determine sharing its allocated sub-channel Data-SRa, may be based on the STAs which has traffic to be scheduled in either UL (based on BSR) or DL. FIG. 17 depicts an example of eligible STAs for the set of APa and APb. For example, in FIG. 17, APa only has buffered traffic to STAa-x in area 2.1 and STAa-y in area 3, neither of which reported it is in the range/area of APb. The APa may decide to schedule STAa-x and STAa-y in this shared TXOP on the sub-channel allocated to itself, and based on this scheduling decision, it determines that the resource allocated to itself (APa) can be shared to APb. FIG. 18 depicts an example of eligible STAs for the set of APb and APc. Similarly, for APb, it may determine the allocated sub-channel to itself (by sharing AP), may be shared by APc, because the potential STAs (STAb-w in area 2.2, STAb-z in area 3, FIG. 18) to be scheduled have reported they are not in the range/area of APc.

Based on the eligible AP set for assigned resource to each AP, each shared and sharing AP may determine the STAs suitable to be scheduled in the sharable resource (e.g. Data-SRa or Data-SRb). For each AP (i.e. for each assigned resource) the criteria for determining the suitable STAs may be based on the channel state/RSSI measurement reports provided by the associated STAs as described in Embodiment 2 Group Introduction above. A STA which has reported no APs in the eligible AP set except the associated AP is a suitable STA to be scheduled in shared resource. Based on the example in FIG. 16, the eligible AP set for sharable resource Data-SRa is {APa, APb} shared by APa. For APa, the suitable STAs for this resource Data-SRa are the associated STAs which have reported no reception of APb's signals. For APb, the eligible STAs for this sharable resource Data-SRa are the APb's associated STAs which have reported no reception of APa's signals. FIG. 17 illustrates the possible locations of suitable STAs when the eligible AP set for resource Data-SRa is {APa, APb}. Using the terminology in previous sections, these are Group 3 and Group 2.1 STAs in BSS a, and Group 3 and Group 2.3 STAs in BSSb.

Similarly, the eligible AP set for the shared resource Data-SRb is {APb, APc} shared by APb. For APb, the suitable STAs for this resource Data-SRb are the APb's associated STAs which have reported no reception of APc's signals. For APc, the suitable STAs for this shared resource Data-SRb are the APc's associated STAs which have reported no reception of APb's signals. FIG. 18 illustrates the possible locations of suitable STAs when the eligible AP set for resource Data-SRb is {APb, APc}. Using the terminology in previous sections, these are Group 3 and Group 2.2 STAs in BSS b, and Group 3 and Group 2.1 STAs in BSSc.

Variations of Configurations

Each of the methods, described in the above sections entitled Sharing AP Allocated Spatial Reuse (SR) Resource and AP determining sharable SR resource from allocated per-BSS OFTMA/TDMA resource by Sharing AP or a combination of the 2 methods, can be used to configure the same configuration.

Figure 19:
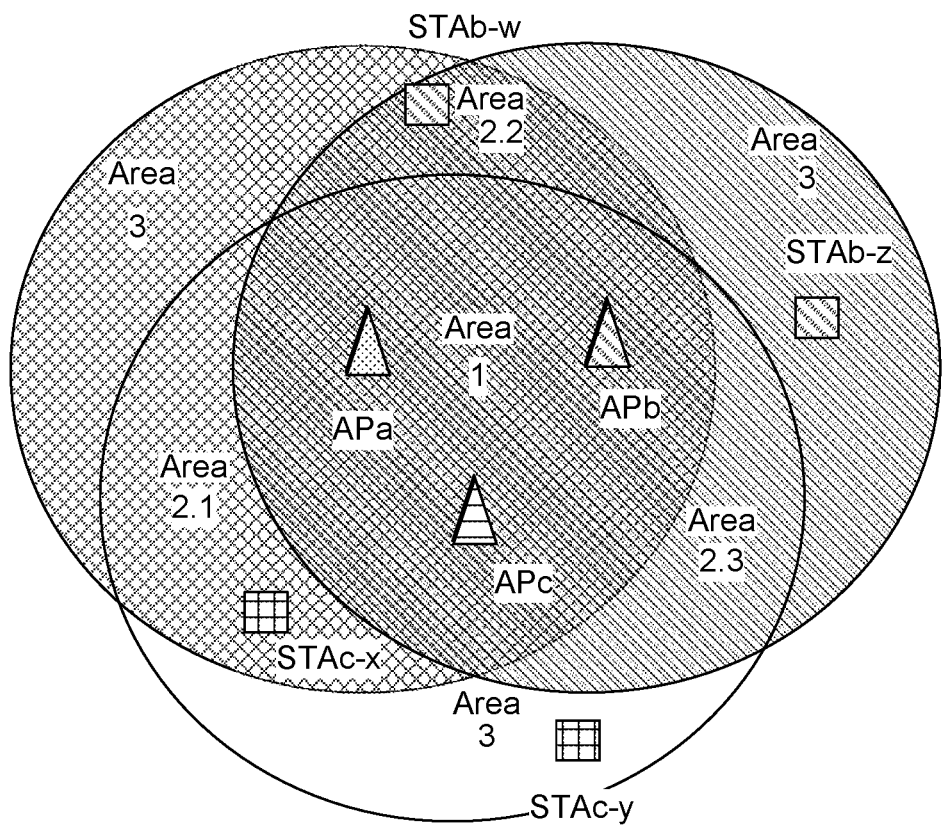
FIG. 19 depicts an example of eligible STAs for the set {APb, APc}.

For example for the SR configuration illustrated in FIG. 19, sub-20-ch4 is sharable to schedule STAs in area 3 by 3 APs participating the TXOP sharing, while each of sub-20-ch1, sub-20-ch2, sub-20-ch3, can be used by 2 APs schedule STAs in area 2 and 3.

Using the approach in the section entitled Sharing AP Allocated Spatial Reuse (SR) Resource above, the eligible AP set, and the suitable STAs for the 4 sub-channels are shown in Table 3 as a configuration of example elements of Sharing AP Allocated Spatial Reuse (SR) Resource.

Using the approach in the section entitled AP determining sharable SR resource from allocated per-BSS OFTMA/TDMA resource by Sharing AP above, the eligible AP set, suitable STAs for the 4 sub-channels are shown in Table 4 as a configuration of example elements of the section entitled AP Determining Sharable SR Resource From Allocated per-BSS OFTMA/TDMA Resource by Sharing AP.

As shown in Table 3 and Table 4, the difference of the 2 approaches is that in the approach of Table 3, the sharing AP determines the sharable resources and eligible AP set for the resource. The spatial reuse sharing decision is centralized in the sharing AP. While in the approach of Table 4, the AP to which the sub-channel is assigned to, determines whether to share the sub-channel and the eligible AP set for the sub-channel. The spatial reuse sharing decision is distributed to each participating AP.

The combination of the 2 approaches is also possible. For example, using the row Sub-20-ch4 from Table 3 (centralized sharing decision for the 4th sub-channel) and rows Sub-20-ch1, Sub-20-ch2, Sub-20-ch3 from Table 4 (distributed sharing decision for the 1st, 2nd, 3rd sub-channels).

Scheduling Assignment for DL SR Resource

The scheduling assignment for a DL MU PPDU is located in EHT-SIG. In the SR resource (Data-SR in previous sections), different U-SIG/EHT-SIG can be transmitted from different APs at the same time/frequency resource. However, the L-STF/L-LTF transmitted from different APs at the resource are the same. This means the estimated channel used to decode U-SIG/EHT-SIG sent in the SR resource may be somewhat different from the actual channel. Although the scheduling by each AP to transmit in sharable resource is based on reported pathloss, multiple OBSS AP transmitted on the same resource may increase the interference. For example, in FIG. 15, although STAa-y has reported no reception of APb and APc, the combined interference from APb and APc may create interference larger than what is measured when STAa-y measures APb or APc individually.

For reliability and to avoid the possible issue above, it is desirable that the signaling portion is robust without SR applied. The resource units (RUs) located within the SR resource can be scheduled by an AP (e.g. APa on the 1st 20 MHz sub-channel, APb on the 2nd 20 MHz sub-channel, APc on the 3rd 20 MHz sub-channel, as shown in FIG. 20) using the EHT-SIG located in the 20 MHz sub-channel assigned to the AP, such that there is no SR performed when receiver is receiving U-SIG/EHT-SIG.

Figure 20:
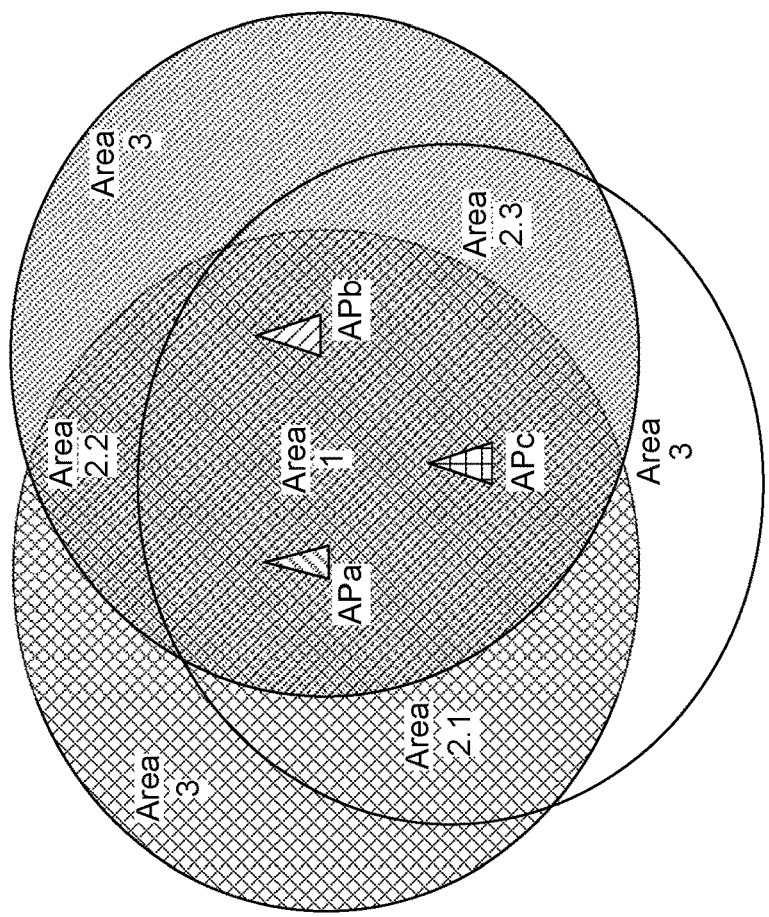
FIG. 20 depicts an example Configuration according to principles of the disclosure.
Figure 21:
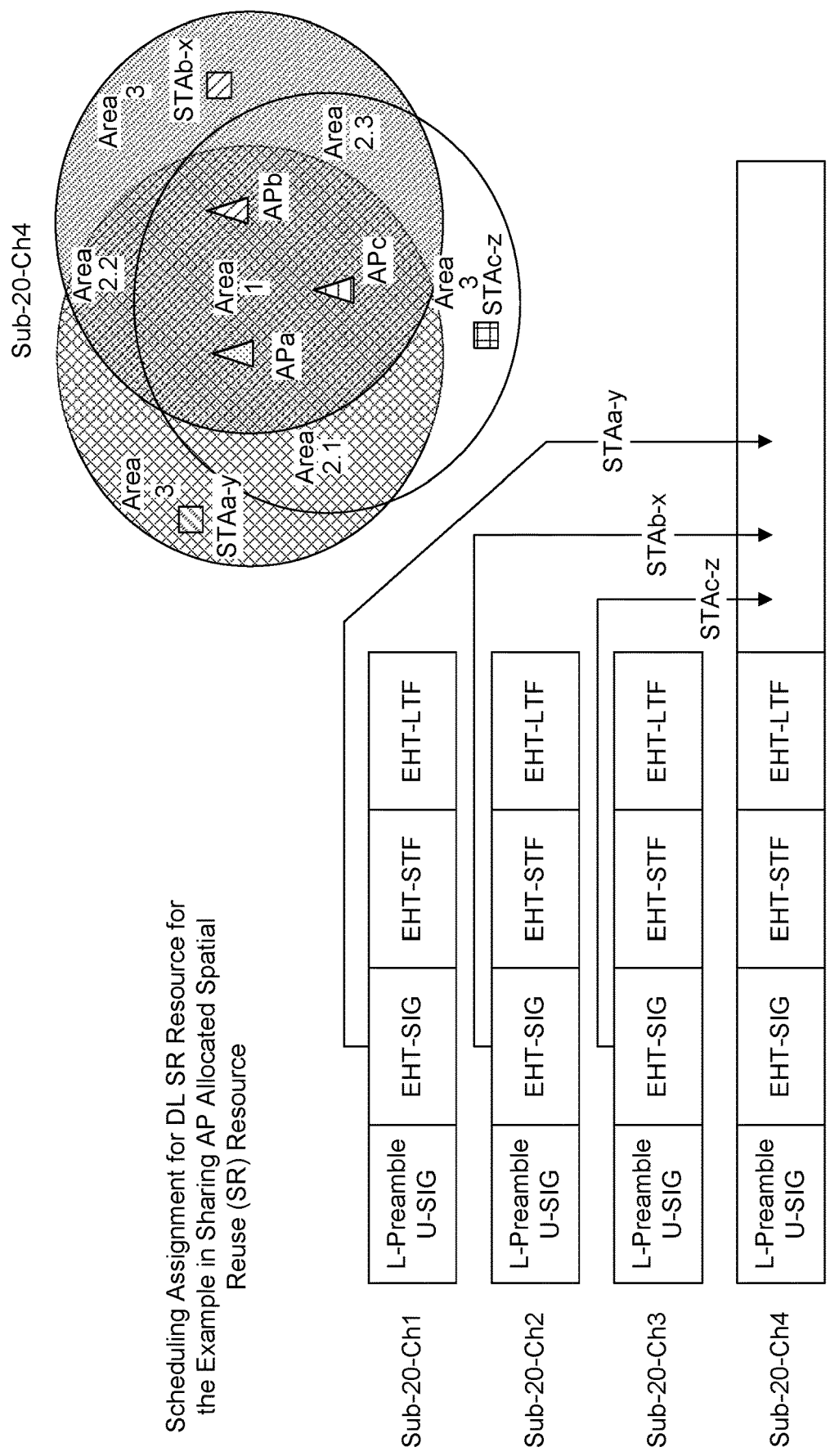
FIG. 21 depicts an example Scheduling Assignment for DL SR resource in a Sharing AP Allocated Spatial Reuse (SR) Resource scheme.
Figure 22:
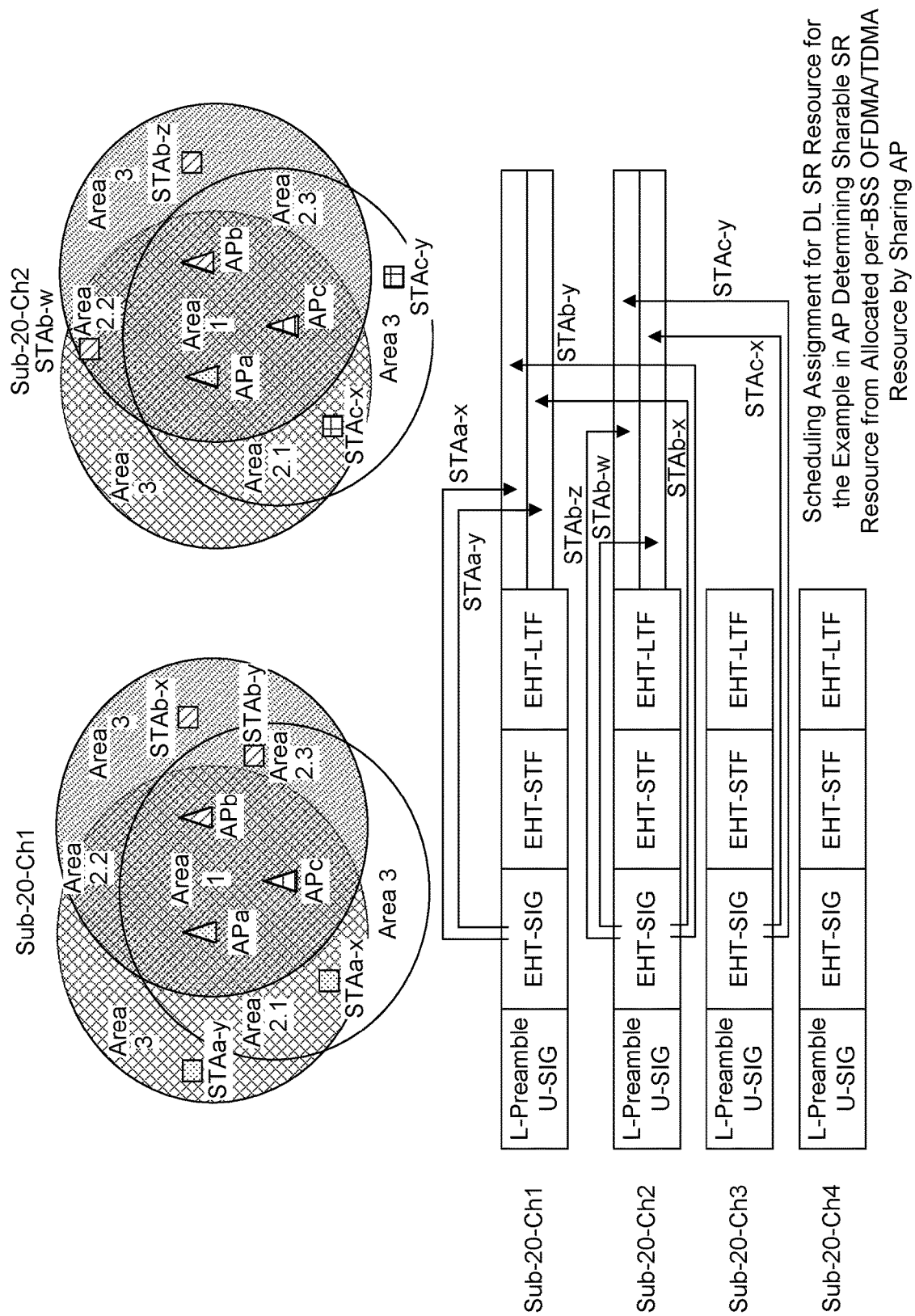
FIG. 22 depicts an example Scheduling Assignment for DL SR resource in an AP Determining Sharable SR Resource From Allocated per-BSS OFDMA/TDMA Resource by Sharing AP scheme.

FIG. 20 illustrates the scheduling assignment for the example described in the above section entitled Sharing AP Allocated Spatial Reuse (SR) Resource. FIG. 21 illustrates the scheduling assignment for the example described in the above section entitled AP Determining Sharable SR Resource from Allocated per-BSS OFTMA/TDMA Resource by Sharing AP. The EHT-SIG in the 20 MHz-subchannel allocated to the AP, not only schedules the RUs of the 20 MHz, it also schedules the RUs in the SR resource.

The scheduling information for the RU allocated in the SR resource may contain a specific EHT-STF or EHT-LTF sequences specific to the transmitting AP, for the correct AGC and channel estimation for the RU in the SR resource.

The U-SIG/EHT-SIG in the SR resource in the case of Sharing AP Allocated Spatial Reuse (SR) Resource, can be an identical information transmitted from different APs transmitting in the SR resource. This information may be derived from the info carried in the CTAS frame. The information may contain EHT-STF or EHT-LTF sequences specific to the transmitting APs of the SR resource, to facilitate the RSSI/channel measurement for the sub-channel by STAs which use the procedures described in the below section entitled Measurements in the shared TXOP but cannot hear the CTAS frame from the sharing AP.

Measurements in the Shared TXOP

The CTLS frame may serve as an indicator for a non-AP STA in any of the BSS's (even those not participating the TXOP sharing) to a 20 MHz sub-channel it may find a particular APs DL PPDUs from which it can perform measurement for a future reporting to its own associated AP. The STA may rely on the sub-channel assignment to measure the RSSI from different APs at different 20 MHz sub-channels.

Alternatively, the measuring STA does not need to know AP's identity. It simply reports the RSSI/channel states with the measurement time and sub-channel number. The associated AP determines to which AP a report entry is associated, based on the time and sub-channel allocation.

In a CTR frame, an AP may indicate which 20-MHz sub-channels it has not been recently allocated in the previous shared TXOPs, as a suggestion to the Sharing AP. The Sharing AP assigning the suggested 20 MHz sub-channel to the shared AP would increase the opportunities of the shared AP to be measured at the subchannel in which it has not transmitted DL PPDUs in the previous TXOPs.

Extremely High Throughput—Short Training Field/Long Training Field (EHT-STF/LTF) Sequence in the SR Resource The same issue of AGC/channel estimation (i.e. the estimated channel is somewhat different from the actual channel due to the same waveform of STF/LTF sequences from multiple APs) described above as Scheduling Assignment for DL SR Resource may also happen in the EHT portion of the PPDU transmitted in a sharable resource.

The sharing AP may assign different EHT-STF or EHT LTF sequence for each transmitting AP using the sharable SR resource. For example, the CTAS frame from sharing AP may indicate this assignment to shared APs. Different sequences from different AP transmitters may aid the AGC and channel estimation of the data portion undergoing SR.

The different sequences may also aid the RSSI/channel measurement for other non-intended receiver who is measurement the sub-channel for the signals from different APs as described in above in Measurements in the Shared TXOP.

When AP schedules a STA in a sharable resource, the scheduling assignment may indicate the EHT STF/LTF sequences used in the assigned RUs in the sharable resource. Alternatively, the CTLS frame may contain/echo the STF/LTF sequence assignment received from sharing AP, to all STAs in the BSSs participating the TXOP sharing.

The following documents are included for reference material and are incorporated by reference as indicated hereinabove.
  [1] IEEE Std 802.11™-2016: Wireless LAN Medium Access Control (MAC) and Physical Layer (PHY) Specifications
  [2] IEEE P802.11ax™/D3.0, Amendment 6: Enhancements for High Efficiency WLAN", 2018.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

The invention claimed is:

1. A method performed by a first wireless access point, AP, for coordinating a multi-access point transmission in a wireless network of multiple access points, APs, the method comprising:
receiving from each of a plurality of stations in the wireless network, an indication of interference from one or more overlapping APs;
determining station groups based on the indications of interference received from the plurality of stations;
transmitting at least one indication frame to the multiple APs, the at least one indication frame comprising interference level information related to a transmit opportunity, TXOP;
receiving at least one response frame from one or more APs of the multiple APs indicating participation within the TXOP;
transmitting a trigger frame to the one or more APs that indicated participation within the TXOP, wherein the trigger frame comprises information indicating respective power levels for the participating APs;
transmitting downlink data to at least one station of a station group of the determined station groups during the TXOP; and
receiving an acknowledgement transmission from the at least one station.

2. The method of claim 1, wherein transmitting the trigger frame comprises transmitting an indication of power levels for the participating APs for use with station groups.

3. The method of claim 1, wherein the indications of interference received from the plurality of stations is stored in the first wireless AP in an interference level table.

4. The method of claim 1, wherein receiving, from each of the plurality of stations in the wireless network, an indication of interference comprises receiving a transmission of received signal strength indication from each station in the wireless network.

5. The method of claim 1, wherein transmitting at least one indication frame comprises transmitting at least one coordinated multi-access point TXOP indication frame in a physical protocol data unit to a candidate set of APs, wherein the indication frame is transmitted to the candidate set in multiple channels simultaneously.

6. The method of claim 1, wherein receiving at least one response frame comprises receiving at least one coordinated multi-access TXOP response frame from one or more of the multiple APs to participate with the TXOP of the first wireless AP, wherein the response frames are received in multiple channels simultaneously.

7. The method of claim 1, further comprising:
after receiving at least one response frame, transmitting at least one schedule frame confirming a grant of joining the TXOP and providing resource allocation information to the participating APs.

8. The method of claim 7, wherein the schedule frame comprises basic service set identification or AP identification information, and time and frequency information for a downlink transmission.

9. The method of claim 1, further comprising:
receiving at least one local schedule frame from the participating APs.

10. A wireless access point, AP, comprising circuitry, including a transmitter, a receiver, a processor, and memory, the wireless AP configured to:
receive from each of a plurality of stations in the wireless network, an indication of interference from one or more overlapping APs;
determine station groups based on the indications of interference received from the plurality of stations;
transmit at least one indication frame to the multiple APs, the at least one indication frame comprising information related to a transmit opportunity, TXOP;
receive at least one response frame from one or more APs of the multiple APs indicating participation within the TXOP;
transmit a trigger frame to the one or more APs that indicated participation within the TXOP, wherein the trigger frame comprises information indicating respective power levels for the participating APs;
transmit downlink data to at least one station of a station group of the determined station groups during the TXOP; and
receive an acknowledgement transmission from the at least one station.

11. The wireless AP of claim 10, wherein the trigger frame comprises an indication of power levels for the participating APs for use with station groups.

12. The wireless AP of claim 10, wherein the indications of interference received from the plurality of stations is stored in the first wireless AP in an interference level table.

13. The wireless AP of claim 10, wherein the wireless AP is configured to receive an indication of interference via received signal strength indication from each station in the wireless network.

14. The wireless AP of claim 10, wherein the at least one indication frame comprises at least one coordinated multi-access point TXOP indication frame transmitted in a physical protocol data unit to a candidate set of APs, wherein the indication frame is transmitted to the candidate set in multiple channels simultaneously.

15. The wireless AP of claim 10, wherein the at least one response frame comprises at least one coordinated multi-access TXOP response frame from one or more of the multiple APs to participate with the TXOP of the first wireless AP, wherein the response frames are received in multiple channels simultaneously.

16. The wireless AP of claim 10, further configured to:
after receiving at least one response frame, transmit at least one schedule frame to confirm a grant of joining the TXOP and provide resource allocation information to the participating APs.

17. The wireless AP of claim 16, wherein the schedule frame comprises basic service set identification or AP identification information, and time and frequency information for a downlink transmission.

18. A computer-readable storage device having instructions thereon, which when executed, performs a method conducted by an access point, AP, for coordinating a multi-access point transmission in a wireless network of multiple access points, APs, the method comprising:
receiving from each of a plurality of stations in the wireless network, an indication of interference from one or more overlapping APs;
determining station groups based on the indications of interference received from the plurality of stations;
transmitting at least one indication frame to the multiple APs, the at least one indication frame comprising interference level information related to a transmit opportunity, TXOP;
receiving at least one response frame from one or more APs of the multiple APs indicating participation within the TXOP;
transmitting a trigger frame to the one or more APs that indicated participation within the TXOP, wherein the trigger frame comprises information indicating respective power levels for the participating APs;
transmitting downlink data to at least one station of a station group of the determined station groups during the TXOP; and
receiving an acknowledgement transmission from the at least one station.

19. The computer-readable storage device method of claim 18, wherein transmitting the trigger frame comprises transmitting an indication of power levels for the participating APs for use with station groups.

20. The computer-readable storage device method of claim 18, wherein receiving, from each of the plurality of stations in the wireless network, an indication of interference comprises receiving a transmission of received signal strength indication from each station in the wireless network.

* * * * *